US012768928B2

(12) United States Patent
Cassella et al.

(10) Patent No.: US 12,768,928 B2
(45) Date of Patent: Oct. 20, 2026

(54) SUBHARMONIC TAGS FOR LOCALIZATION, RANGING, AND NAVIGATION IN GPS-DENIED ENVIRONMENTS

(71) Applicant: Northeastern University, Boston, MA (US)

(72) Inventors: Cristian Cassella, Boston, MA (US); Hussein Hussein, Roxbury, MA (US)

(73) Assignee: Northeastern University, Boston, MA (US)

( * ) Notice: Subject to any disclaimer, the term of this patent is extended or adjusted under 35 U.S.C. 154(b) by 102 days.

(21) Appl. No.: 18/850,817

(22) PCT Filed: May 15, 2023

(86) PCT No.: PCT/US2023/022224
§ 371 (c)(1),
(2) Date: Sep. 25, 2024

(87) PCT Pub. No.: WO2023/220468
PCT Pub. Date: Nov. 16, 2023

(65) Prior Publication Data
US 2025/0224478 A1 Jul. 10, 2025

Related U.S. Application Data

(60) Provisional application No. 63/342,037, filed on May 13, 2022.

(51) Int. Cl.
*G01S 5/02* (2010.01)
*G01S 5/14* (2006.01)
*G06K 19/07* (2006.01)

(52) U.S. Cl.
CPC .............. *G01S 5/0205* (2013.01); *G01S 5/14* (2013.01); *G06K 19/0723* (2013.01)

(58) Field of Classification Search
CPC ................. G01S 5/0205; G01S 13/753; G01S 2013/9316; G01S 5/14; G01S 13/878; G06K 19/0723
See application file for complete search history.

(56) References Cited

U.S. PATENT DOCUMENTS 5,883,575 A * 3/1999 Ruby .................... H03H 9/585 333/187
7,812,719 B2 * 10/2010 Djuric ................ G08B 21/0275 340/539.23

(Continued)

OTHER PUBLICATIONS

Ma et al., "Ubiquitous tagless object locating with ambient harmonic tags", IEEE Infocom 2016—The 35th Annual IEEE International Conference on Computer Communications, San Francisco, CA, USA, 2016, pp. 1-9.

*Primary Examiner* — Peter M Bythrow
(74) *Attorney, Agent, or Firm* — Adams & Reese LLP

(57) ABSTRACT

Provided herein are methods and systems for quasi-harmonic tags (qHT) including an electromagnetic resonator, an input mesh including an input notch filter having a resonant frequency of $\omega_{input}$, an output mesh including an output notch filter having a resonant frequency of $\omega_{output}$; and an antenna, wherein the qHT is configured to emit a comb output signal responsive to an input signal having an input frequency (op twice a resonance frequency of at least one of the electromagnetic resonators.

20 Claims, 21 Drawing Sheets

(56) References Cited

U.S. PATENT DOCUMENTS

| | | | | |
|---|---|---|---|---|
| 7,953,303 | B2 * | 5/2011 | Gheorma | G02F 1/2255 385/2 |
| 2007/0252666 | A1 | 11/2007 | Shtrom | |
| 2007/0285245 | A1 * | 12/2007 | Djuric | G08B 21/0275 340/572.1 |
| 2008/0182416 | A1 | 7/2008 | Collins et al. | |
| 2008/0252293 | A1 | 10/2008 | Lagae et al. | |
| 2011/0007383 | A1 | 1/2011 | Gheorma et al. | |
| 2015/0198708 | A1 * | 7/2015 | Khan | G01S 13/878 342/146 |
| 2015/0302231 | A1 * | 10/2015 | Makimoto | G06K 19/0672 235/492 |
| 2025/0246818 | A1 * | 7/2025 | Schmidhammer | H03H 9/6483 |

* cited by examiner

SUBHARMONIC TAGS FOR LOCALIZATION, RANGING, AND NAVIGATION IN GPS-DENIED ENVIRONMENTS

CROSS REFERENCE TO RELATED APPLICATIONS

This application claims benefit under 35 U.S.C. § 119(e) of U.S. Provisional Application No. 63/342,037, filed on 13 May 2022, entitled "SUBHARMONIC TAGS FOR LOCALIZATION, RANGING, AND NAVIGATION IN GPS-DENIED ENVIRONMENTS," the entirety of which is incorporated by reference herein.

STATEMENT REGARDING FEDERALLY SPONSORED RESEARCH OR DEVELOPMENT

This invention was made with government support under Grant Number 1854573 awarded by the National Science Foundation. The government has certain rights in the invention.

BACKGROUND

Unmanned vehicles (UVs) have attracted a growing attention in the past decade, generating new opportunities in a variety of emerging Internet-of-Things (IoT) applications, including precision farming, aerial imaging, smart manufacturing, maintenance in harsh locations, first response, and assisted living. However, for UVs to play a key role in all these applications, it is necessary to precisely localize their positions in a variety of operational settings without compromising their battery life. In this regard, the global positioning system (GPS) has been a key resource in the last decades for navigation and localization in outdoor settings. Nevertheless, GPS is often unavailable in indoor and underground environments. Also, its accuracy may exceed by orders of magnitude the size of the UVs available today. Consequently, a growing interest is being paid to alternative methodologies for the localization of UVs in GPS-denied environments. In this regard, ranging techniques based on Light-Detection-and-Ranging (LIDAR), ultrasound detection, and frequency-modulated-continuous-wave (FMCW) radars have been extensively investigated, offering accurate localization capabilities. Nonetheless, these techniques are power-hungry, which renders them not suitable for low-power applications. Also, they require complex designs for the interrogation nodes, in addition to sophisticated pattern recognition algorithms.

Radio-Frequency Tags for Ranging

Driven by the on-going Radio-Frequency-Identification (RFID) revolution, an increasing attention has been paid to ranging techniques based on Radio-Frequency (RF) passive tags. In particular, the adoption of RF passive tags has been recently proposed for localizing UVs in GPS-denied environments through a low-cost monitoring system not requiring any power from the targeted UVs. In fact, a directive wireless transceiver can interrogate a passive tag onboard of a UV with a continuous-wave (CW) signal and leverage the received signal strength indicator (RSSI) or the phase of the backscattering signal to extract the distance between the tag and the transceiver.

However, the accuracy of this approach degrades when targeting UVs operating in rich-multipath environments, like most indoor or underground settings. In particular, the RSSI of passive tags is inevitably distorted by multipath interference affecting its backscattered signal, which can be strong in indoor or underground settings as shown in FIG. 1A. Such interference causes ranging errors that can be severe, especially when electrically small passive tags are used to fit into compact UVs. Relying on the phase difference between the received backscattered signal and the interrogation signal also leads to a low-ranging accuracy due to multipath, as well as to cycle-ambiguity causing multiple distances between the tag and the transceiver to correspond to the same phase difference between interrogation and backscattered signals. Furthermore, since most conventional linear passive tags operate as linear electromagnetic (EM) scatterers, their backscattered signals have the same frequency of their interrogation signals. As a result, significant ranging inaccuracies are also introduced by electromagnetic clutter and by readers' self-interference as in FIGS. 1B and 1C. In this context, a new category of nonlinear systems known as harmonic-tags (HTs) has been recently proposed for ranging applications. Unlike linear passive tags, HTs can employ the electrostatic nonlinearities of varactors or diodes to generate backscattered signals at twice the frequency of their interrogation signal as in FIGS. 2A and 2B. This feature provides HTs' readers with a strong immunity to both electromagnetic clutter and their own self-interference, which conventional linear passive tags cannot offer. Yet, the accuracy that a reader can ultimately achieve when remotely monitoring its distance from an HT in an indoor or underground setting remains inevitably limited by the multipath interference affecting the HT's backscattered signal (see FIG. 1A). In fact, the only way for a reader to accurately assess its distance from an HT is to rely on power-hungry wideband transmitters and on intense signal processing operations. Therefore, a new class of passive tags is needed to overcome such deficiencies and provide ranging accuracy insensitive to multipath interference as well as to readers' self-interference and clutter.

SUMMARY

Provided herein are methods and systems employing quasi-harmonic tags (qHT) for localization, ranging, and navigation. Each qHT advantageously leverages a dependency between comb line separation (Δf) and power received by the qHT ($P_r$) by generating unique frequency comb patterns corresponding to a distance (d) of the qHT from each single interrogating beacon. Thus, a range from each interrogating beacon to the qHT can be established. In addition, by extracting Δf at each one of a plurality of interrogating beacons, it is possible to use trilateration to determine an azimuthal position of the qHT within the common area covered by the beacons, thereby localizing the qHT. Furthermore, because the comb line separation is not affected by multipath, self-interference, or clutter, it can be used to provide an accurate localization even in indoor and noisy electromagnetic media. Therefore, through use of qHTs, it is possible to navigate in GPS-denied environments. In addition, because the qHTs are passive, they do not require any periodic battery replacement or other maintenance, which in many cases is very hard to perform. These properties make qHTs especially suitable for sensing in harsh environments and/or for the implementation of a navigation functionality, particularly in an indoor or underground settings. Such qHTs can therefore be used, for example, to enable self-driving unmanned aerial and ground vehicles.

In one aspect, a quasi-harmonic tag (qHT) is provided. The qHT includes an electromagnetic resonator. The qHT also includes an input mesh including an input notch filter having a resonant frequency of $\omega_{input}$. The qHT also includes an output mesh including an output notch filter having a resonant frequency of $\omega_{output}$. The qHT also includes an antenna. The qHT is configured to emit a comb output signal responsive to an input signal having an input frequency $\omega_p$ twice a resonance frequency of at least one of the electromagnetic resonators.

In some embodiments, the qHT is passive and batteryless. In some embodiments, the comb output signal is symmetrically distributed around a frequency of $\omega_p/2$. In some embodiments, a comb line spacing (Δf) of the comb output signal is a function of a power of the input signal. In some embodiments, power received at the qHT ($P_T$) from the input signal is inversely proportional to a distance (d) of the qHT from a source of the input signal. In some embodiments, for a known transmission power (P), each Δf corresponds to a single d.

In some embodiments, the electromagnetic resonator includes at least one of a dielectric resonator, a surface acoustic wave (SAW) resonator, a bulk acoustic wave (BAW) resonator, a CMOS resonator, a ceramic resonator, or a distributed resonator. In some embodiments, the qHT also includes at least one additional electromagnetic resonator. In some embodiments, the antenna includes a single transceiver. In some embodiments, the antenna is an input antenna of the input mesh. In some embodiments, the qHT also includes an output antenna of the output mesh. In some embodiments, at least one of the input notch filter or the output notch filter is a LC-notch filter. In some embodiments, the qHT also includes a connecting circuit connecting the input mesh and the output mesh in a common branch of the input mesh and the output mesh to form a two-port degenerate parametric circuit. In some embodiments, the connecting circuit includes one or more varactors and an inductor.

In another aspect, a remote localization system is provided. The system includes at least one remote asset including a qHT. The system also includes a localization device. The localization device includes a transmitter configured to transmit an input signal at a known power P. The localization device also includes a receiver configured to receive a comb output signal produced by the qHT of the at least one remote asset. The localization device also includes a processor. The processor is configured to execute the step of detecting a comb line spacing (Δf) of the comb output signal produced by the qHT of the at least one remote asset. The processor is also configured to execute the step of determining, from the detected Δf and P, a distance d between the at least one remote asset and the localization device.

In some embodiments, the localization device further comprises at least one of a directive wireless transceiver, a directive beam-steering transmitter, a narrowband low-power transceiver, or combinations thereof. In some embodiments, the remote localization system also includes a second localization device configured to determine a second distance $d_2$ between the remote asset and the second localization device. In some embodiments, the localization system also includes a third localization device configured to determine a third distance $d_3$ between the remote asset and the third localization device. In some embodiments, the processor is also configured to execute the step of triangulating, from d, $d_2$, and $d_3$, a location of the remote asset.

In still another aspect, a method for asset localization is provided. The method includes receiving, at a remote asset including a qHT of claim 5, an input signal having a received power $P_T$ at the qHT. The method also includes emitting, responsive to the input signal, a comb output signal having a comb line spacing (Δf), wherein Δf is a function of $P_T$ and, for any transmission power (P) of the input signal, $P_T$ is inversely proportional to a distance (d) of the qHT from a source of the input signal. The method also includes determining, from the Δf of the comb output signal and P, the distance d between the remote asset and the source of the input signal.

In some embodiments, the source of the input signal is a localization device. In some embodiments, the method also includes transmitting, from a transmitter of the localization device, the input signal at the transmission power P. In some embodiments, the method also includes receiving, at the localization device, the comb output signal produced by the qHT of the remote asset. In some embodiments, the method also includes detecting, at the localization device, the comb line spacing (Δf) of the comb output signal produced by the qHT of the remote asset. In some embodiments, the step of determining further comprises calculating, by a processor of the localization device using the detected Δf and P, the distance d between the remote asset and the localization device.

Additional features and aspects of the technology include the following:

1. A quasi-harmonic tag (qHT) comprising:
   - an electromagnetic resonator;
   - an input mesh including an input notch filter having a resonant frequency of $\omega_{input}$;
   - an output mesh including an output notch filter having a resonant frequency of $\omega_{output}$; and
   - an antenna,
   - wherein the qHT is configured to emit a comb output signal responsive to an input signal having an input frequency $\omega_p$ twice a resonance frequency of at least one of the electromagnetic resonators.

2. The qHT of feature 1, wherein the qHT is passive and batteryless.

3 The qHT of any of features 1-2, wherein the comb output signal is symmetrically distributed around a frequency of $\omega_p/2$.

4. The qHT of any of features 1-3, wherein a comb line spacing (Δf) of the comb output signal is a function of a power of the input signal.

5. The qHT of feature 4, wherein:
   - power received at the qHT ($P_T$) from the input signal is inversely proportional to a distance (d) of the qHT from a source of the input signal; and
   - for a known transmission power (P), each Δf corresponds to a single d.

6. The qHT of any of features 1-5, wherein the electromagnetic resonator includes at least one of a dielectric resonator, a surface acoustic wave (SAW) resonator, a bulk acoustic wave (BAW) resonator, a CMOS resonator, a ceramic resonator, or a distributed resonator.

7. The qHT of any of features 1-6, further comprising at least one additional electromagnetic resonator.

8. The qHT of any of features 1-7, wherein the antenna includes a single transceiver.

9. The qHT of any of features 1-8, wherein:
   - the antenna is an input antenna of the input mesh; and
   - the qHT further comprises an output antenna of the output mesh.

10. The qHT of any of features 1-9, wherein at least one of the input notch filter or the output notch filter is a LC-notch filter.

11. The qHT of any of features 1-10, further comprising a connecting circuit connecting the input mesh and the output mesh in a common branch of the input mesh and the output mesh to form a two-port degenerate parametric circuit.

12. The qHT of feature 9, wherein the connecting circuit includes one or more varactors and an inductor.

13. A remote localization system comprising:

at least one remote asset including a qHT of any of features 1-12;

a localization device including:

a transmitter configured to transmit an input signal at a known power P;

a receiver configured to receive a comb output signal produced by the qHT of the at least one remote asset; and a processor configured to execute the steps of:

detecting a comb line spacing (Δf) of the comb output signal produced by the qHT of the at least one remote asset, and determining, from the detected Δf and P, a distance d between the at least one remote asset and the localization device.

14. The remote localization system of feature 13, wherein the localization device further comprises at least one of a directive wireless transceiver, a directive beam-steering transmitter, a narrowband low-power transceiver, or combinations thereof.

15. The remote localization system of any of features 13-14, further comprising:

a second localization device configured to determine a second distance $d_2$ between the remote asset and the second localization device;

a third localization device configured to determine a third distance $d_3$ between the remote asset and the third localization device; and the processor further configured to execute the step of triangulating, from d, $d_2$, and $d_3$, a location of the remote asset.

16. A method for asset localization comprising:

receiving, at a remote asset including a qHT of any of features 1-12, an input signal having a received power $P_T$ at the qHT;

emitting, responsive to the input signal, a comb output signal having a comb line spacing (Δf), wherein Δf is a function of $P_T$ and, for any transmission power (P) of the input signal, $P_T$ is inversely proportional to a distance (d) of the qHT from a source of the input signal; and determining, from the Δf of the comb output signal and P, the distance d between the remote asset and the source of the input signal.

17. The method of feature 16, wherein the source of the input signal is a localization device and the method further comprises:

transmitting, from a transmitter of the localization device, the input signal at the transmission power P.

18. The method of feature 17, further comprising receiving, at the localization device, the comb output signal produced by the qHT of the remote asset.

19. The method of feature 18, further comprising detecting, at the localization device, the comb line spacing (Δf) of the comb output signal produced by the qHT of the remote asset.

20. The method of feature 19, wherein the step of determining further comprises calculating, by a processor of the localization device using the detected Δf and P, the distance d between the remote asset and the localization device.

DETAILED DESCRIPTION

Systems and methods employing quasi-harmonic tags (qHT) for localization, ranging, and navigation in GPS-denied environments are described herein.

Ranging and Localization

Figure 1A:
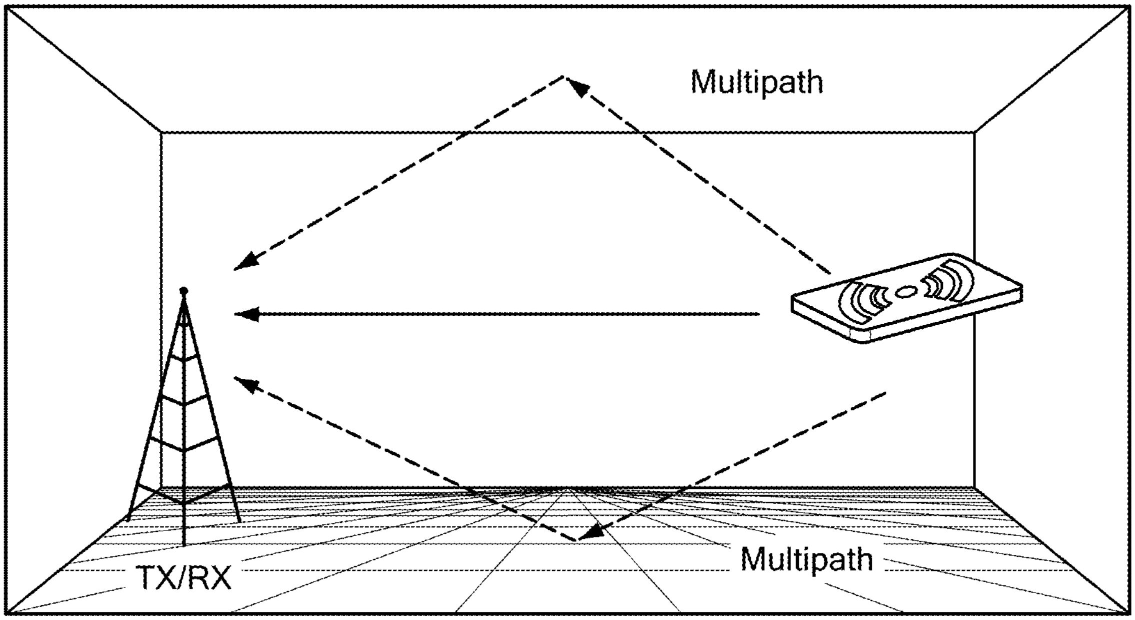
PRIOR ART FIG. 1A
FIG. 1A illustrates multipath interference in accordance with the prior art wherein miniaturized tags radiate backscattered signals omnidirectionally. Consequently, their readers are prone to losses of accuracy due to multipath interference, especially when operating in rich-multipath settings.
Figure 1B:
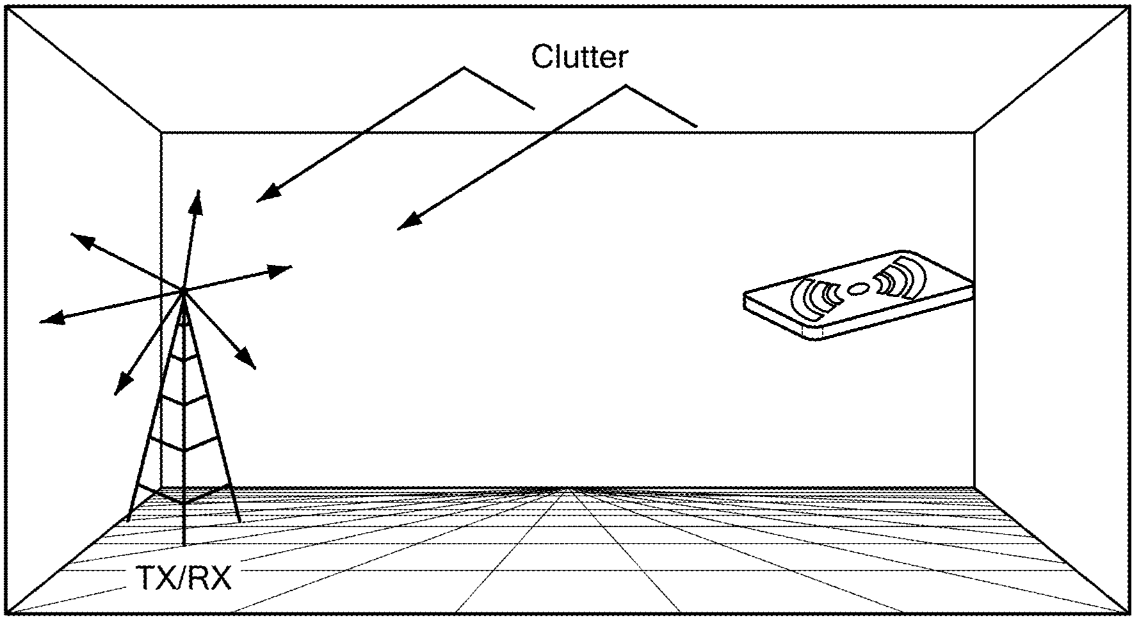
PRIOR ART FIG. 1B
FIG. 1B illustrates clutter in accordance with the prior art wherein a receiver of an RF transceivers may experience losses of accuracy due to clutter when remotely sensing a parameter of interest through a linear passive tag.
Figure 1C:
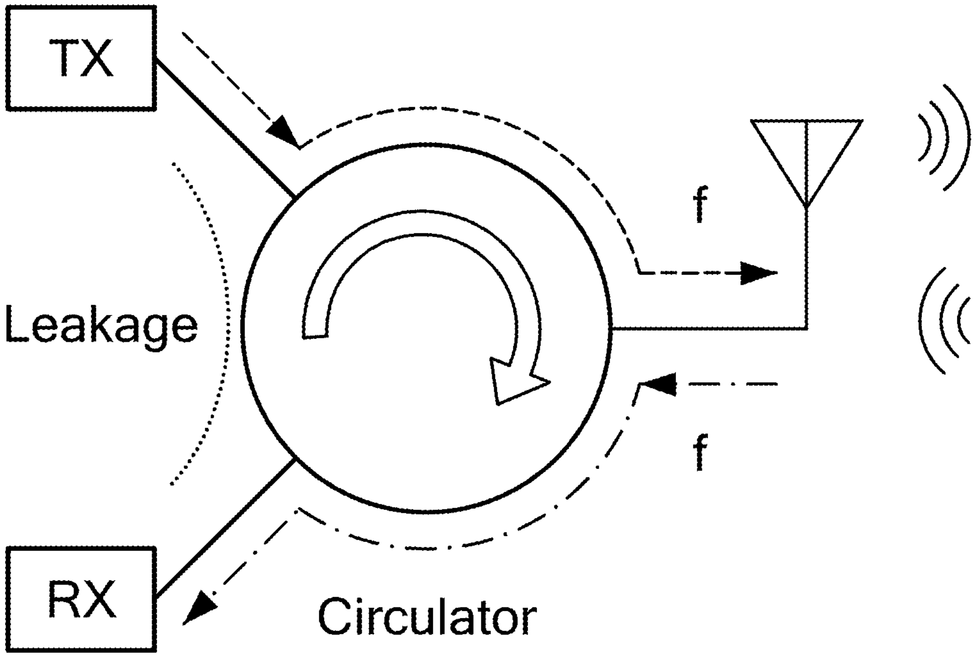
PRIOR ART FIG. 1C
FIG. 1C illustrates self-interference in accordance with the prior art wherein RF transceivers using the same frequency channel for both transmission and reception may suffer from losses of accuracy due to self-interference (SI) when sensing a parameter of interest through a linear passive tag; SI may be caused by a limited isolation in the circulator that such transceivers generally leverage to be able to transmit and receive information with the same antenna.
Figure 2A:
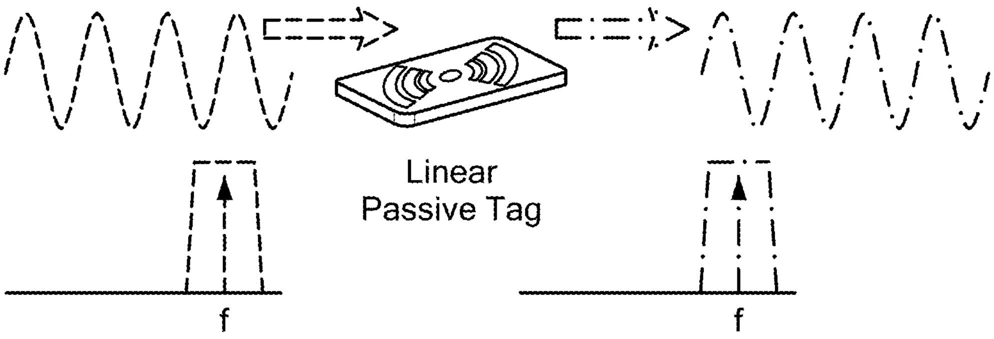
PRIOR ART FIG. 2A
FIG. 2A is a schematic representation describing spectral characteristics of interrogation and backscattered signals for linear passive tags in accordance with the prior art.
Figure 2B:
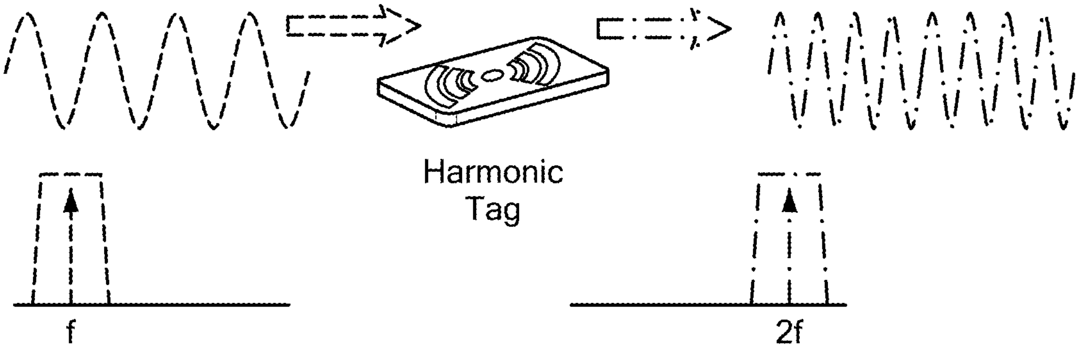
PRIOR ART FIG. 2B
FIG. 2B is a schematic representation describing spectral characteristics of interrogation and backscattered signals for harmonic tags in accordance with the prior art.
Figure 3:
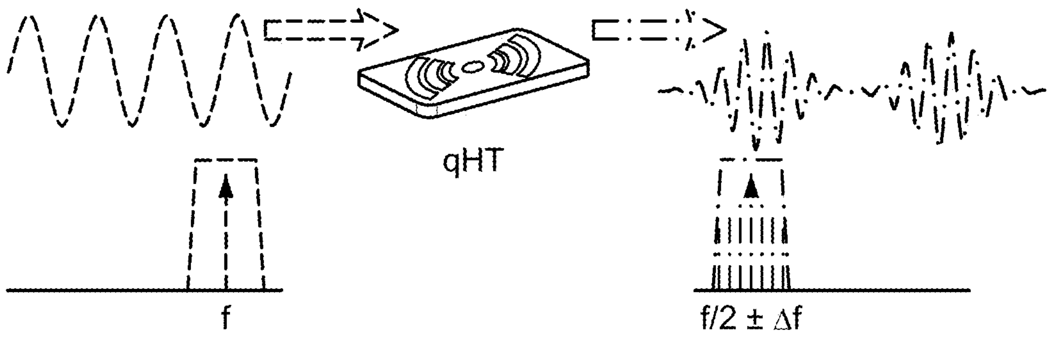
FIG. 3 is a schematic representation describing spectral characteristics of interrogation and backscattered signals for quasi-harmonic tags (qHT) in accordance with various embodiments.
Figure 4A:
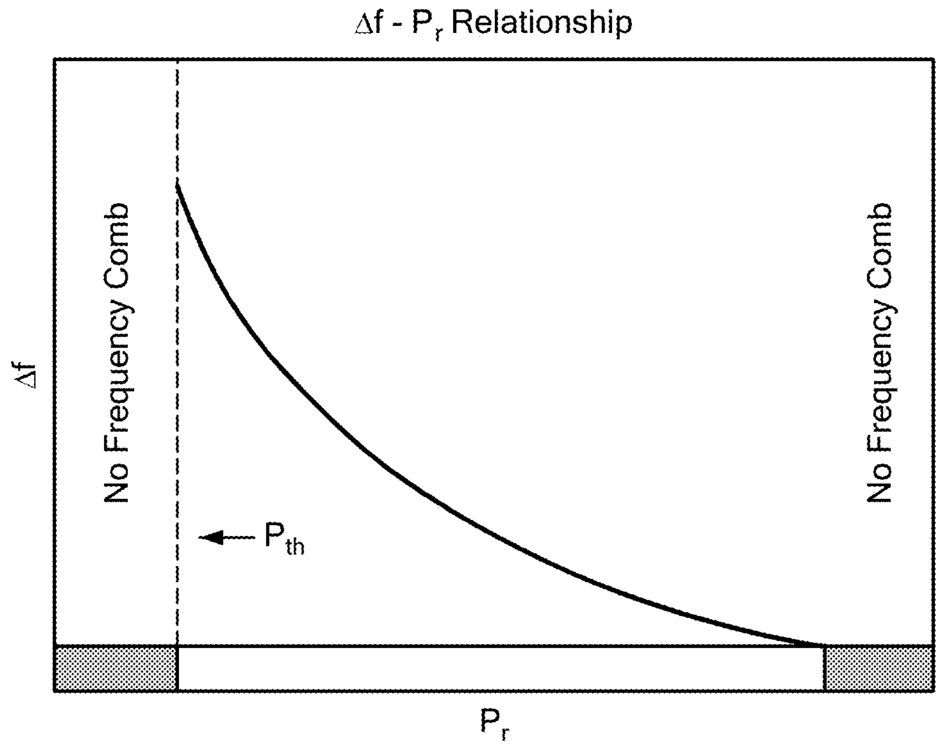
FIG. 4A illustrates the dependence of a qHT's comb line spacing (Δf) on received power level $P_r$ at the qHT.
Figure 4B:
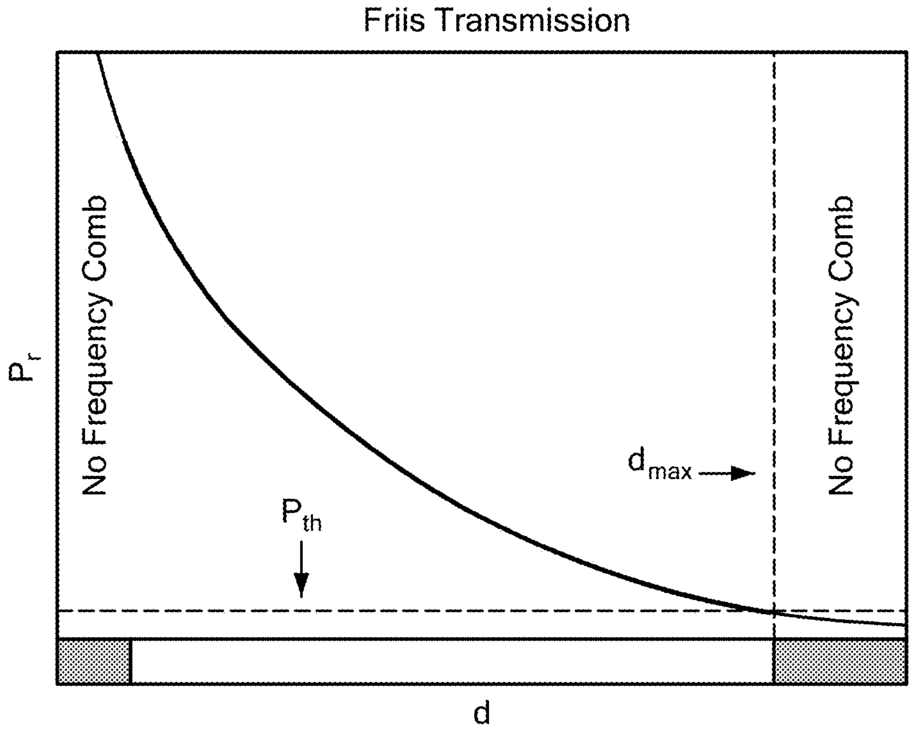
FIG. 4B illustrates the dependence of $P_r$ on a distance (d) of a qHT from its directive interrogating node.

In general, "quasi-Harmonic Tag" (qHT) as described herein exploit nonlinearities to realize a ranging functionality with accuracy intrinsically immune from both self and multipath interference affecting its backscattered signal. Such qHTs receive an interrogation signal with frequency $\omega_p$ and power $P_r$, and respond through the passive generation of a frequency comb as shown in FIG. 3. The comb is symmetrically distributed around half the frequency of the interrogated signal ($\omega_p/2$) and has a comb line spacing (Δf) that is a function of $P_r$ as shown in FIG. 4A. The inverse proportionality between the power received by the qHT ($P_r$) and its distance from the interrogating node (d), which is described by the Friis transmission equation as shown in FIG. 4B, can be exploited to extract d as demonstrated in FIG. 5. In this regard, any Δf value univocally maps to only one specific $P_r$ value, and, consequently, to a specific d value. Therefore, readers with a directive transmitter can remotely assess their distance from a qHT by simply extracting Δf, and the accuracy of such extraction is not degraded by multipath. In fact, while undesired scatterings caused by multipath distort the RSSI and the phase of conventional passive tags' backscattered signal, such scatterings have no effect on the Δf value in qHTs.

Moreover, qHTs' inherent property of dual communication channels at frequencies $\omega_p$ and $\sim\omega_p/2$ confers upon the qHTs' readers immunity to electromagnetic clutter. Also, it further enhances the resilience of qHTs' readers to their own self-interference by allowing them to filter all harmonics of the transmitted interrogation signals generated by nonlinearities in the power amplifier of their transmitter, which is a feature that HTs' readers cannot achieve.

Figure 6:
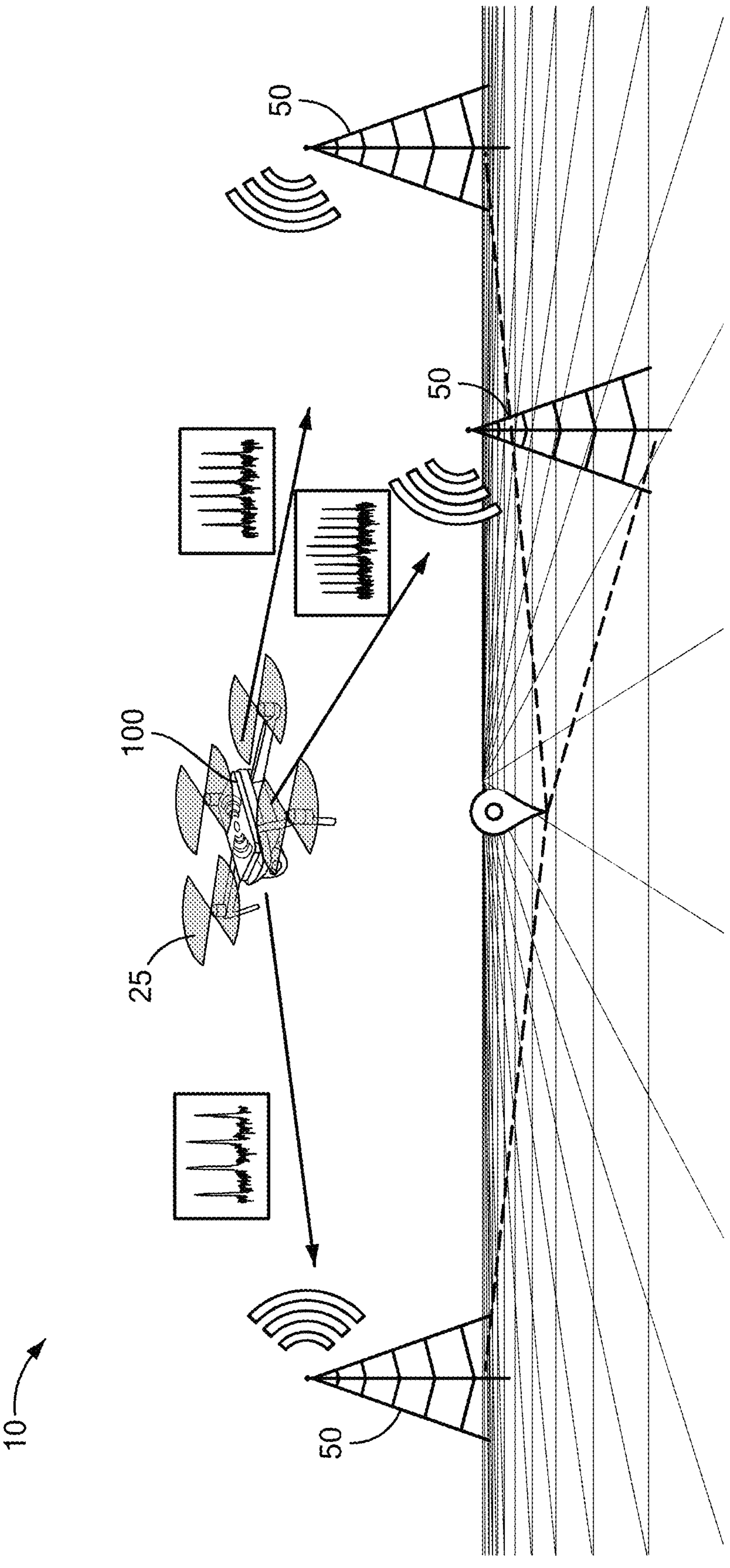
FIG. 6 illustrates a remote localization system in accordance with various embodiments deployed in a typical application scenario for qHTs, wherein the position of a qHT onboard a drone is resolved by extracting the Δf values produced by the qHT after interrogating it sequentially with three separate beacons located at three pre-known positions. The extraction of the drone's distance from each beacon allows the localization of the drone with high accuracy, even in GPS-denied settings.

As shown in FIG. 6, an exemplary system 10 leveraging the Δf-$P_r$ dependency characterizing the operation of qHTs can include a qHT 100 mounted on board a remote asset 25 (e.g., a drone as shown) is sequentially interrogated by different localization devices 50 (e.g., tower beacons as shown) located at predetermined positions. The qHT generates unique frequency comb patterns corresponding to its distance (d) from each single interrogating beacon 50. Hence, by extracting Δf from each one of the beacon's received signal and by using trilateration, the azimuthal position of the qHT can be determined within the common area covered by the beacons 50.

Because the comb line separation is not affected by multipath, self-interference, or clutter, it can be used to provide an accurate localization even in indoor and noisy electromagnetic media. Therefore, through use of qHTs, it is possible to navigate in GPS-denied environments. In that regard, in some embodiments, because the qHTs are passive, they do not require any periodic battery replacement or other maintenance, which in many cases are very hard to perform. These properties make qHTs especially suitable for sensing in harsh environments and/or for the implementation of a navigation functionality, particularly in an indoor or underground settings. Such qHTs can therefore be used, for example, to enable self-driving unmanned aerial and ground vehicles.

Quasi-Harmonic Tags (qHTs)

Figure 7:
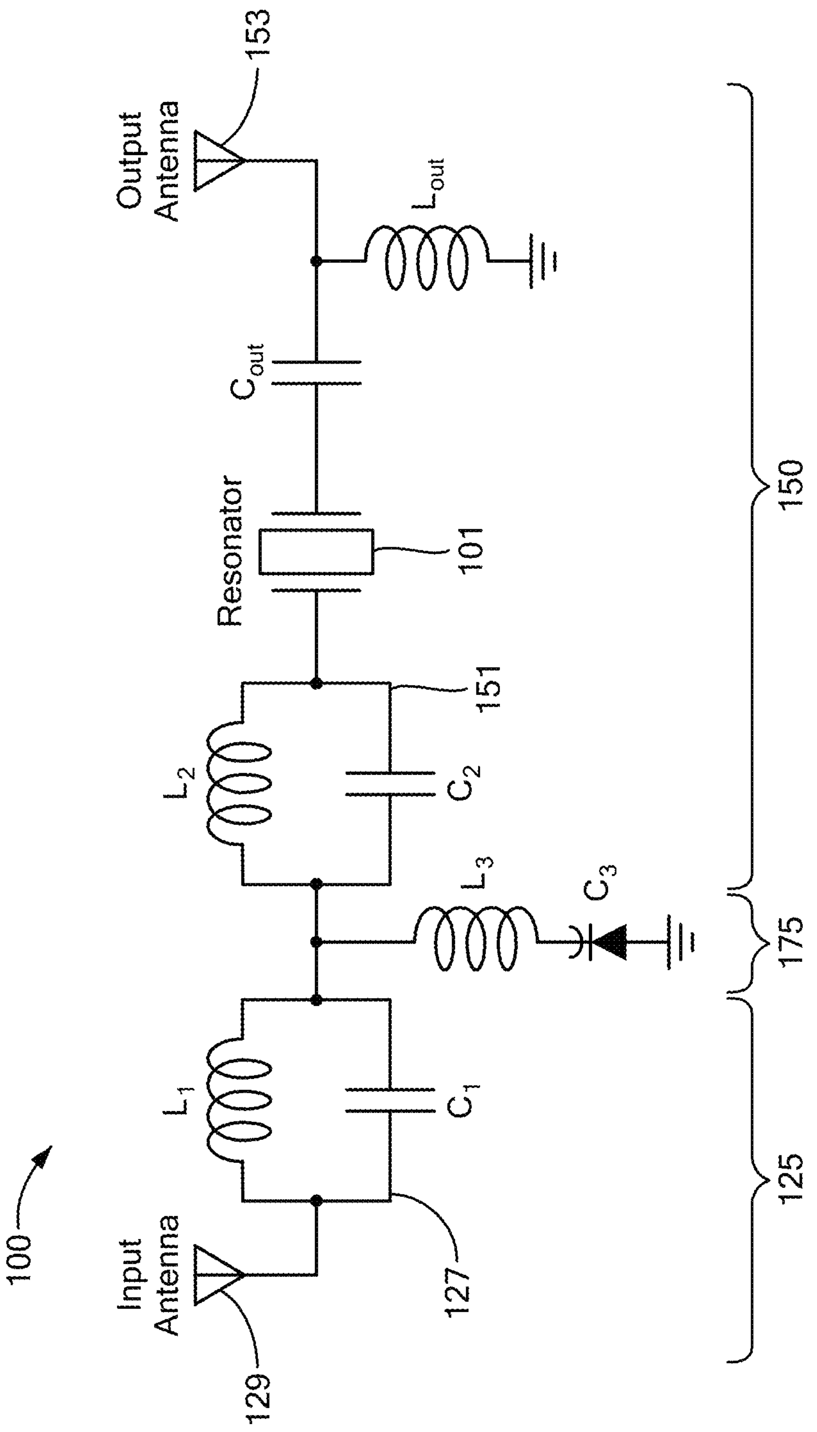
FIG. 7 is a circuit schematic of an experimental qHT in accordance with various embodiments. In the experimental qHT, inductors $L_1$, $L_2$, $L_3$ and $L_{out}$ were selected to have inductances equal to 61 nH, 63 nH, 36 nH and 3.6 nH, respectively. Capacitors $C_1$, $C_2$, $C_3$ and $C_{out}$ were selected to have capacitances equal to 2.3 pF, 0.6 pF, 2.3 pF and 103 pF, respectively. However, it will be apparent in view of this disclosure that inductors having any suitable inductances, and capacitors having any suitable capacitances can be used in accordance with various embodiments.

Referring now to FIG. 7, a qHT 100 can generally include an input mesh 125, an output mesh 150 each containing a set of lumped electronic components and either including or connected to an antenna 129, 153, a connecting circuit 175 connecting the input mesh 125 and the output mesh 150 in a common branch to form a two-port degenerate parametric circuit, and an electromagnetic resonator 101. In some embodiments, all components of the qHT 100 can be fabricated on-chip. To reduce costs, in some embodiments the qHT 100 can be fabricated on cheap printed substrates commonly used in the assembly of printed circuit boards. Advantageously, the qHT 100 are passive and, as such, do not require any periodic battery replacement or other maintenance, and can be used for sensing in harsh environments.

The electromagnetic resonator 101 can be any suitable resonator including, for example, a dielectric resonator, a surface acoustic wave (SAW) resonator, a bulk acoustic wave (BAW) resonator, a CMOS resonator, a ceramic resonator, a distributed resonator, or combinations thereof. For piezoelectric resonators, any type of piezoelectric materials, including, for example, $LiNbO_3$, AlScN, AlN, etc., can be used to fabricate the resonators 101 used in the qHT 100.

The input mesh 125 includes an input notch filter 127. As shown in FIG. 7, in some embodiments, the input notch filter 127 can include an LC-notch filter having an inductor $L_1$ and a capacitor $C_1$ and can have a resonant frequency $$\omega_{input} = \frac{\omega_1}{2\pi} = \frac{1}{\sqrt{L_1C_1}}.$$

For example, in the experimental prototype used for obtaining the experimental results described below, $\omega_{input}\approx 418$ MHz.

The output mesh 150 includes an output notch filter 151. As shown in FIG. 7, in some embodiments, the output notch filter 151 can include an LC-notch filter having an inductor $L_2$ and a capacitor $C_2$ and can have a resonant frequency a resonant frequency $$\omega_{output} = \frac{\omega_2}{2\pi} = \frac{1}{\sqrt{L_2C_2}}.$$

In general, $\omega_{output}$ of the output notch filter 151 should be approximately twice the resonant frequency of the input notch filter 127 placed in the input mesh. For example, in the experimental prototype used for obtaining the experimental results described below, $\omega_{output}\approx 836$ MHz.

The presence of the input notch filter 127 and the output notch filter 151 ensures that the qHT's interrogation signal with angular frequency equal to $\omega_2$ is fully confined in the input mesh, while its parametrically generated output signal, at or around $\omega_1$, is constrained in the output mesh.

In addition, in some embodiments, the output mesh 150 can include a lumped impedance transformation stage including an inductor $L_{out}$ and a capacitor $C_{out}$ to reduce the impact of antenna loading on a minimum achievable threshold power ($P_{th}$) value.

The connecting circuit 175 can generally include a solid-state varactor $C_3$ and an inductor $L_3$ in the common branch to connect the input mesh 125 and the output mesh 150, thereby forming a two-port degenerate parametric circuit for subharmonic generation.

In some embodiments, as shown in FIG. 7, the input mesh 125 can include an input antenna 129 and the output mesh 150 can include an output antenna 153. However, it will be apparent in view of this disclosure that, in some embodiments a single antenna may be connected to both the input mesh 125 and the output mesh 150 to both receive the input signal and transmit the comb output signal.

Figure 13:
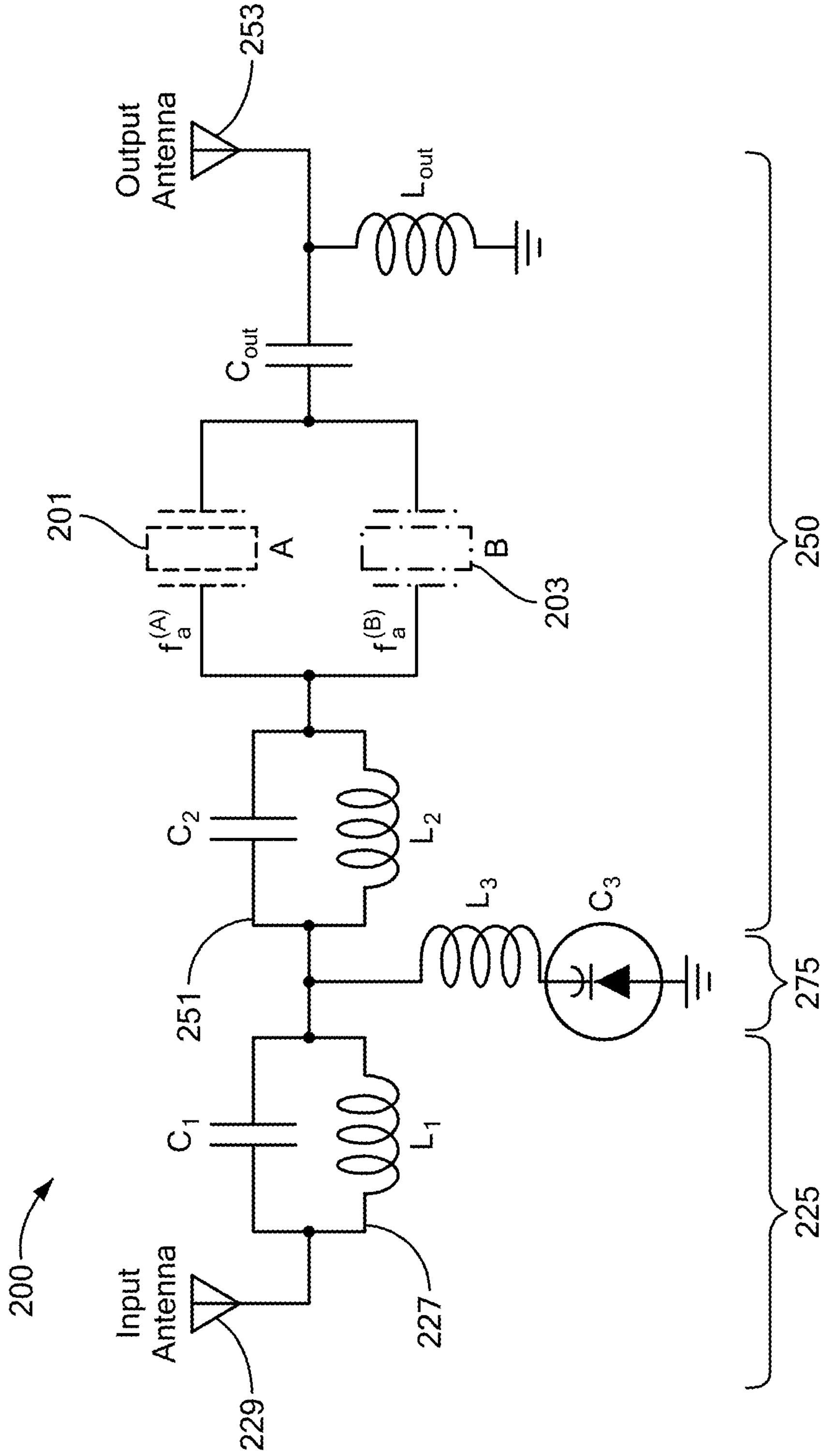
FIG. 13 is a circuit schematic of an experimental two-resonator qHT for localization and ranging.

In some embodiments, as shown, for example, in FIG. 13, a two-resonator qHT 200 can generally be similar to qHT 100 and can also include an input mesh 225 having an input notch filter 227, an output mesh 250 having an output notch filter 251 and either including or connected to an antenna 229, 253, a connecting circuit 275 connecting the input mesh 225 and the output mesh 250 in a common branch to form a two-port degenerate parametric circuit, and two electromagnetic resonators 201, 203.

By providing two resonators 201, 203, the two-resonator qHT 200 can advantageously improve ranging and localization results by facilitating differential signaling and analysis. The electromagnetic resonators 201, 203 can each be any suitable resonator including, for example, a dielectric resonator, a surface acoustic wave (SAW) resonator, a bulk acoustic wave (BAW) resonator, a CMOS resonator, a ceramic resonator, a distributed resonator, or combinations thereof. For piezoelectric resonators, any type of piezoelectric materials, including, for example, $LiNbO_3$, AlScN, AlN, etc., can be used to fabricate the resonators 201, 203 used in the two-resonator qHT 200.

Figure 14:
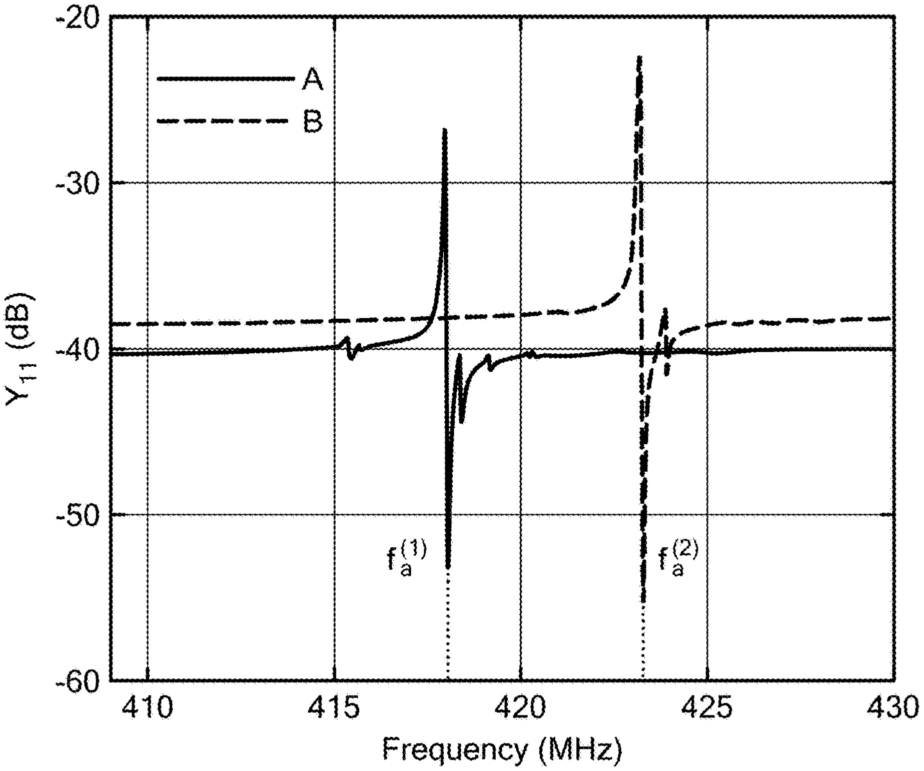
FIG. 14 illustrates a measured admittance response of the two Surface Acoustic Wave (SAW) resonators (A and B) used in the qHT of FIG. 13.
Figure 15:
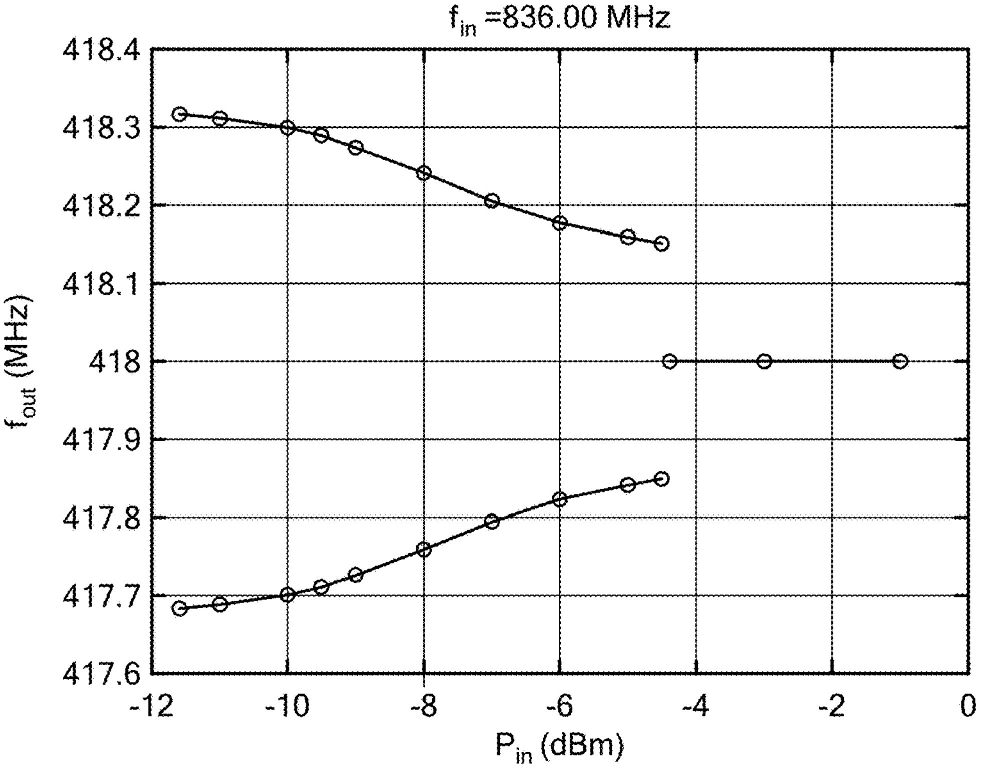
FIG. 15 illustrates a measured frequency of the strongest output power tone produced by the qHT of FIG. 13 vs. the input power coming from an interrogating node. This frequency is equal to half of the input frequency ($f_{in}/2$) minus the modulation frequency.
Figure 16A:
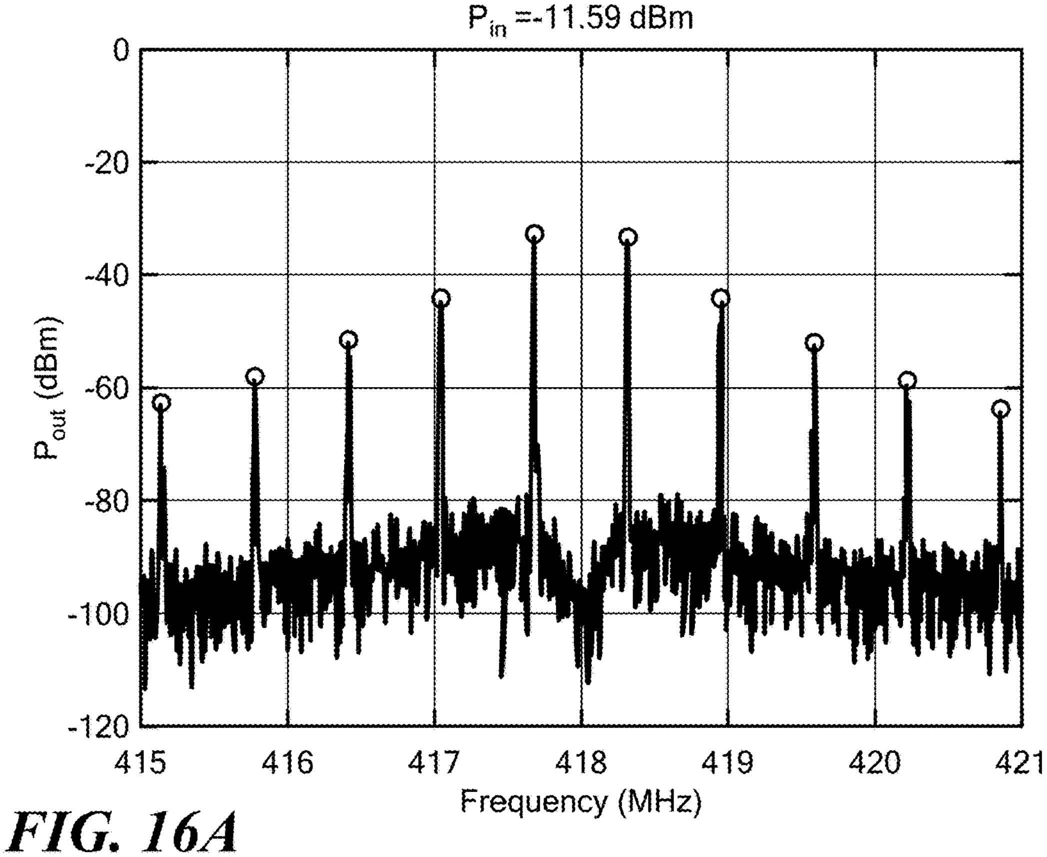
FIGS. 16A-16K illustrate measured output spectra of the qHT of FIG. 13 for different input power levels (Pin). The spectra clearly show that the generation of frequency combs is triggered, providing a means to remotely track the power received by the tag through a frequency read out scheme independent of multi-path, clutter, and a tag reader's self-interference.
Figure 16B:
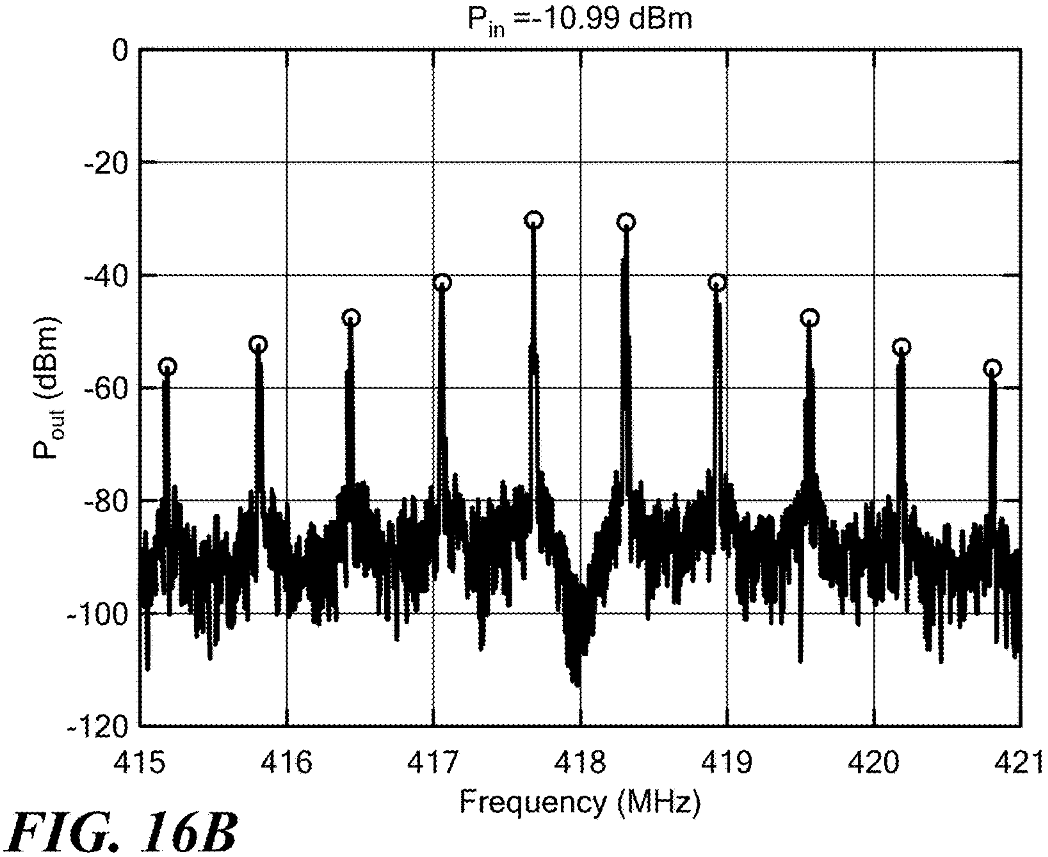
Figure 16C:
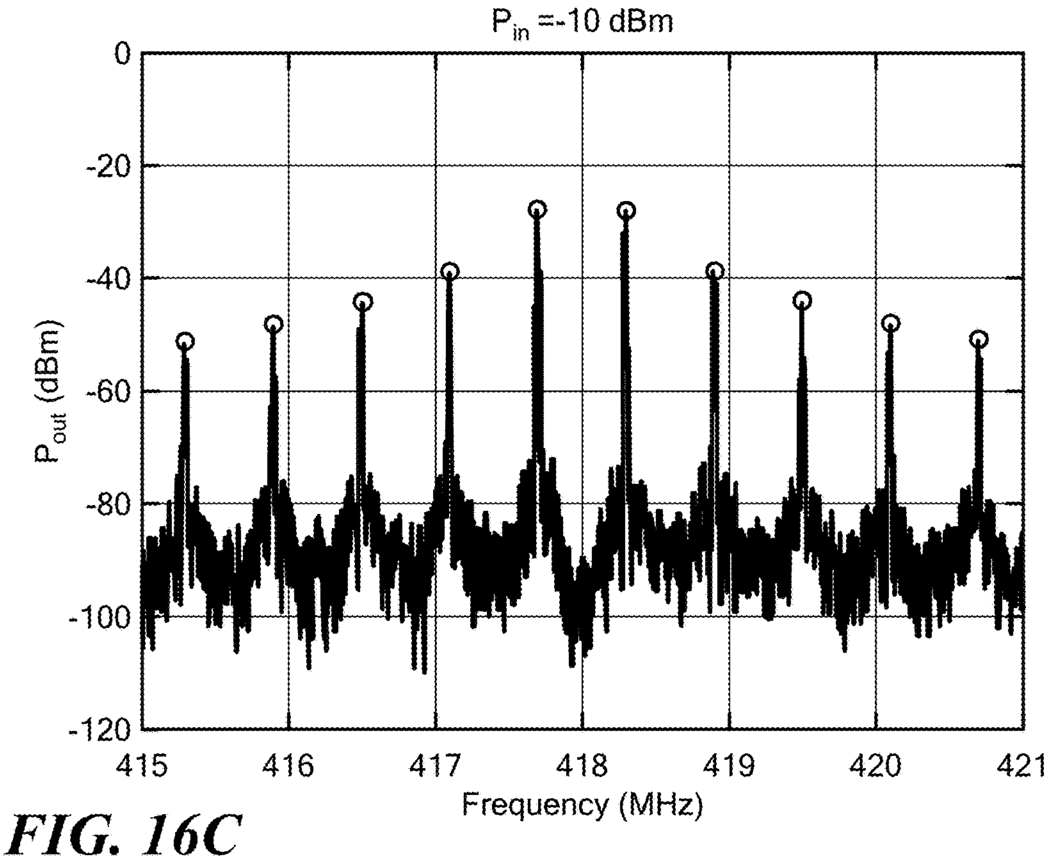
Figure 16D:
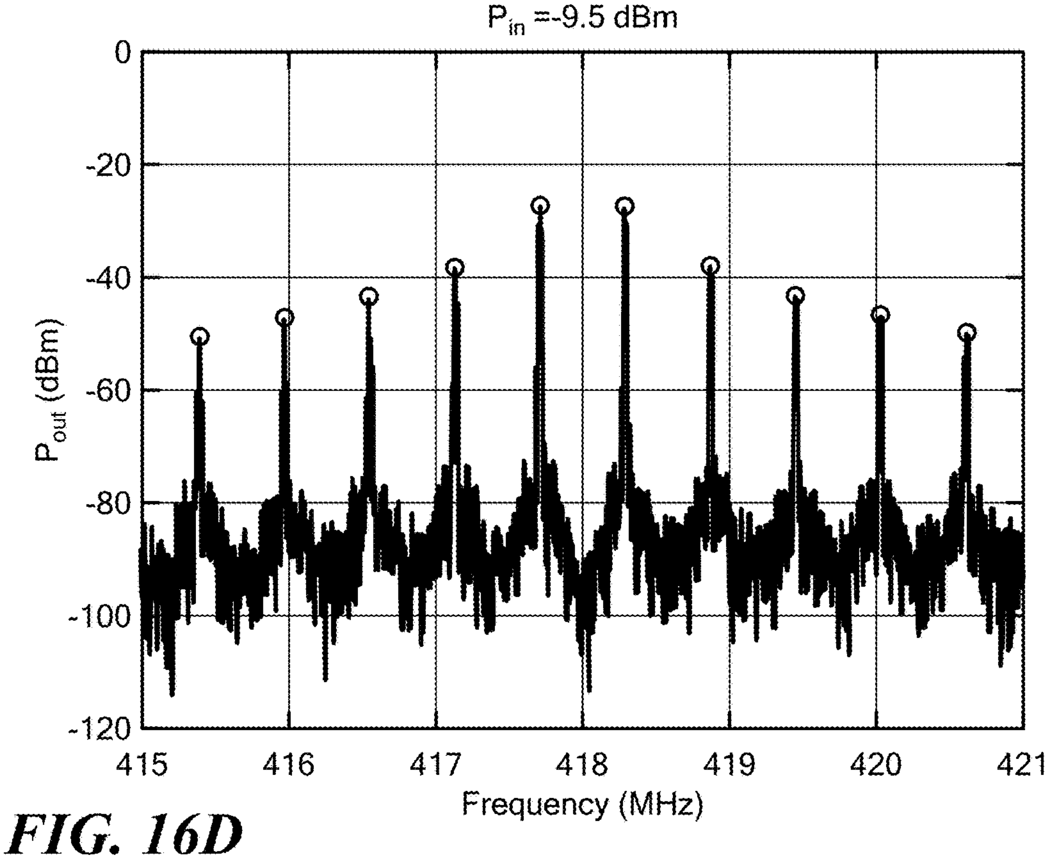
Figure 16E:
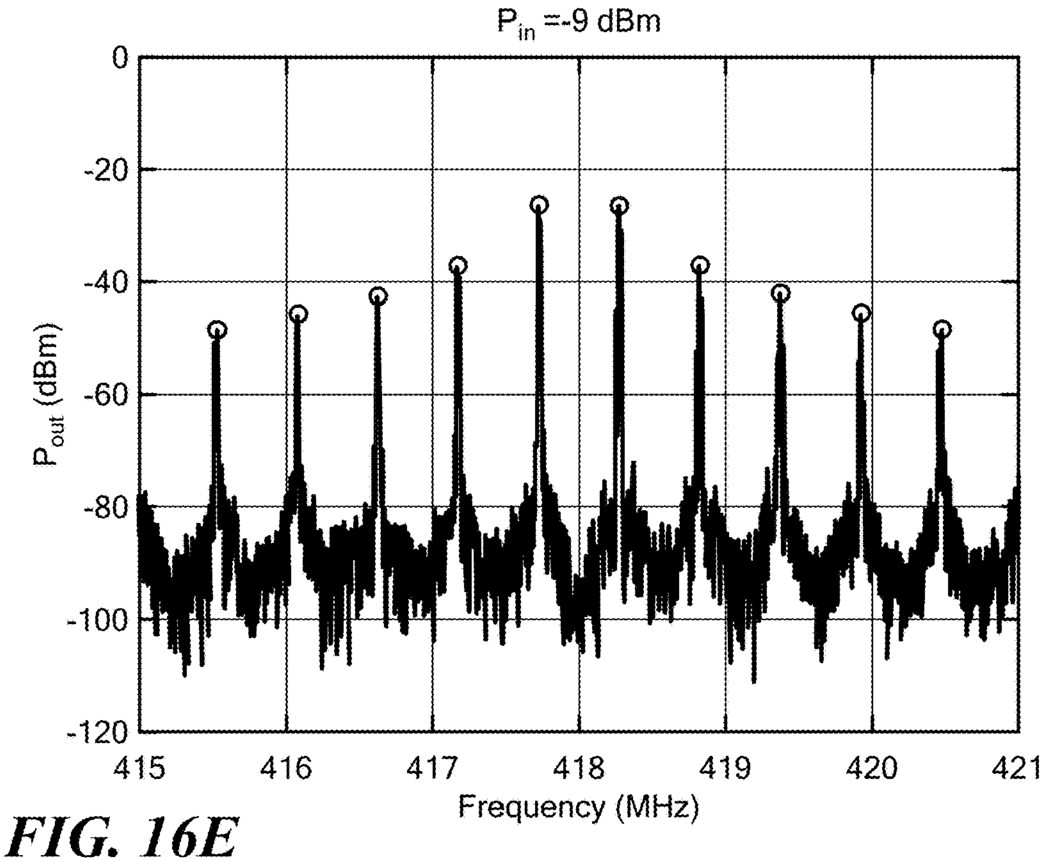
Figure 16F:
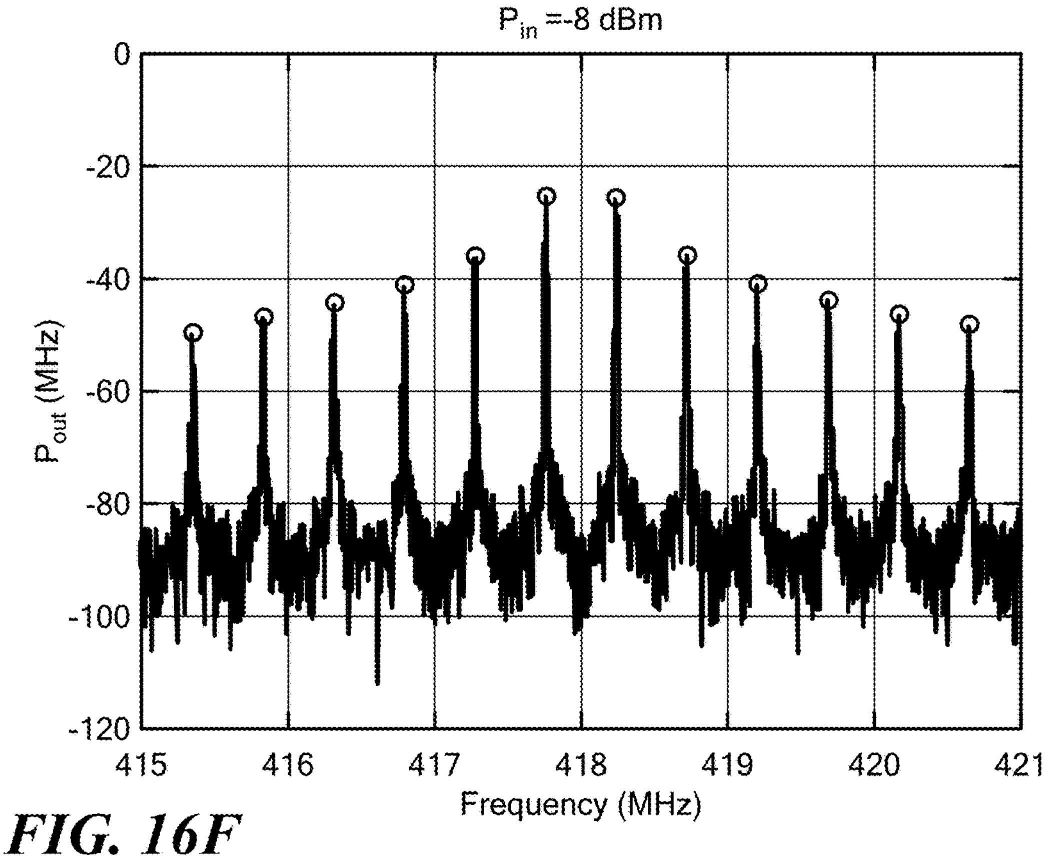
Figure 16G:
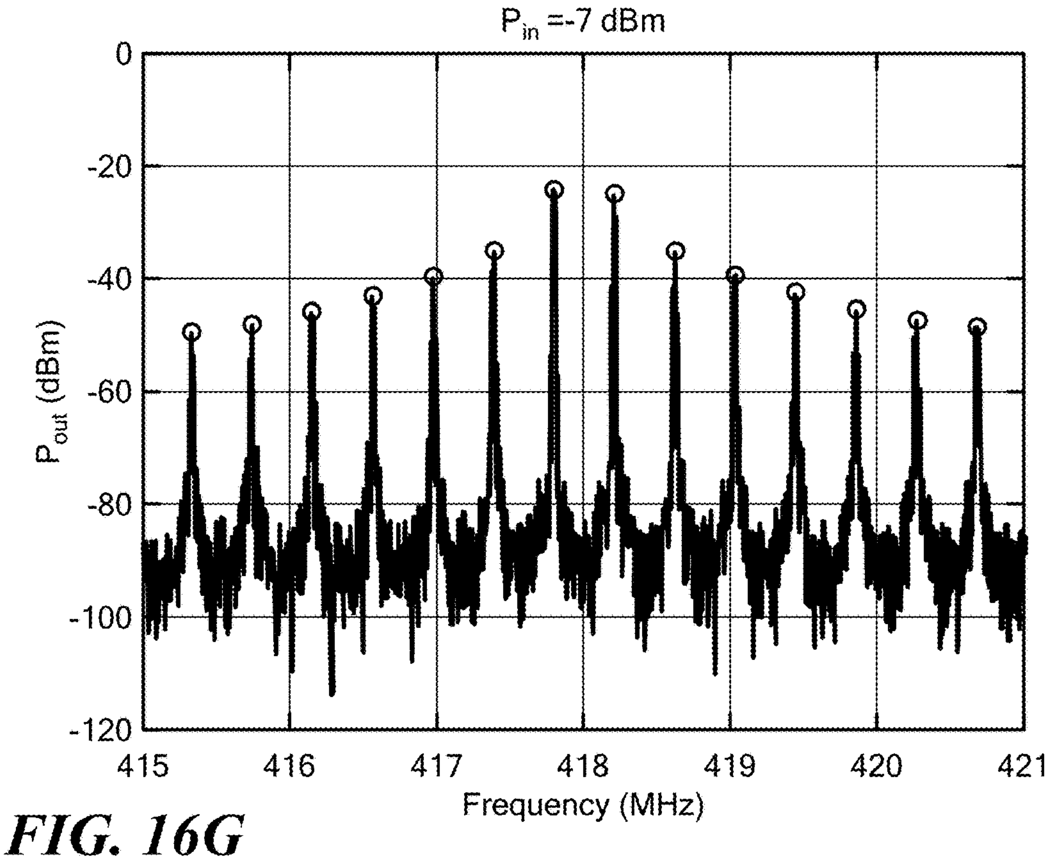
Figure 16H:
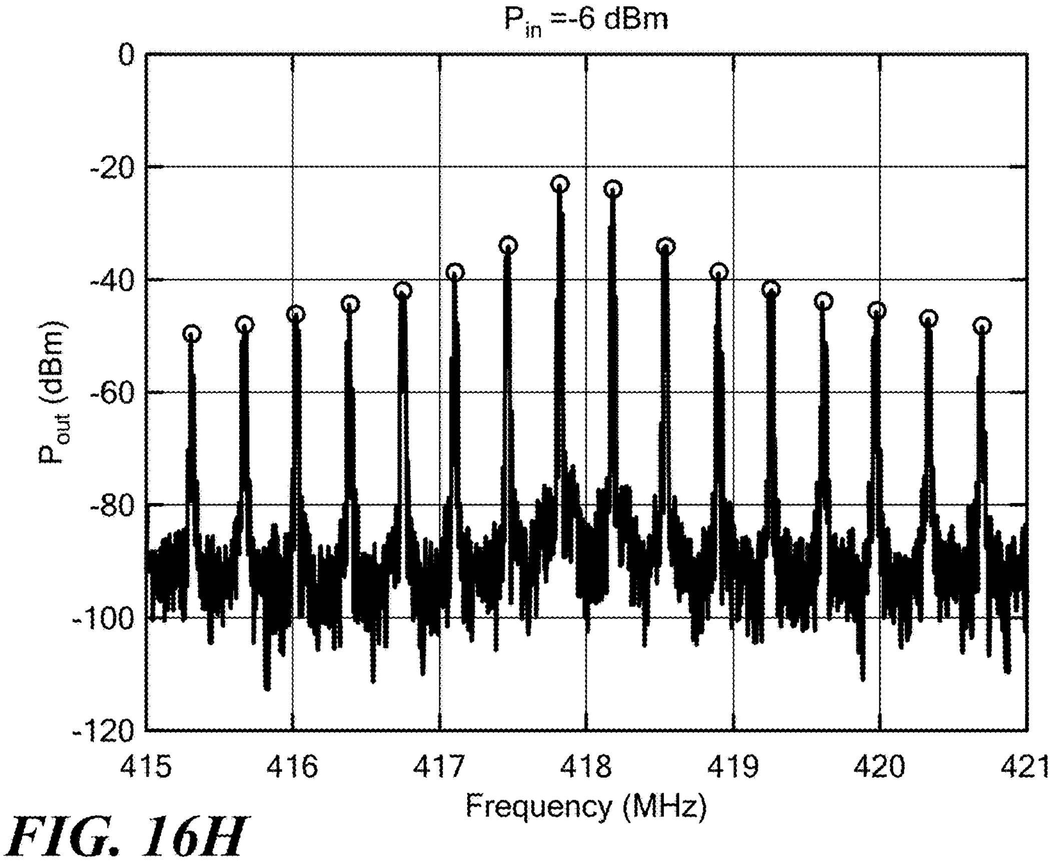
Figure 16I:
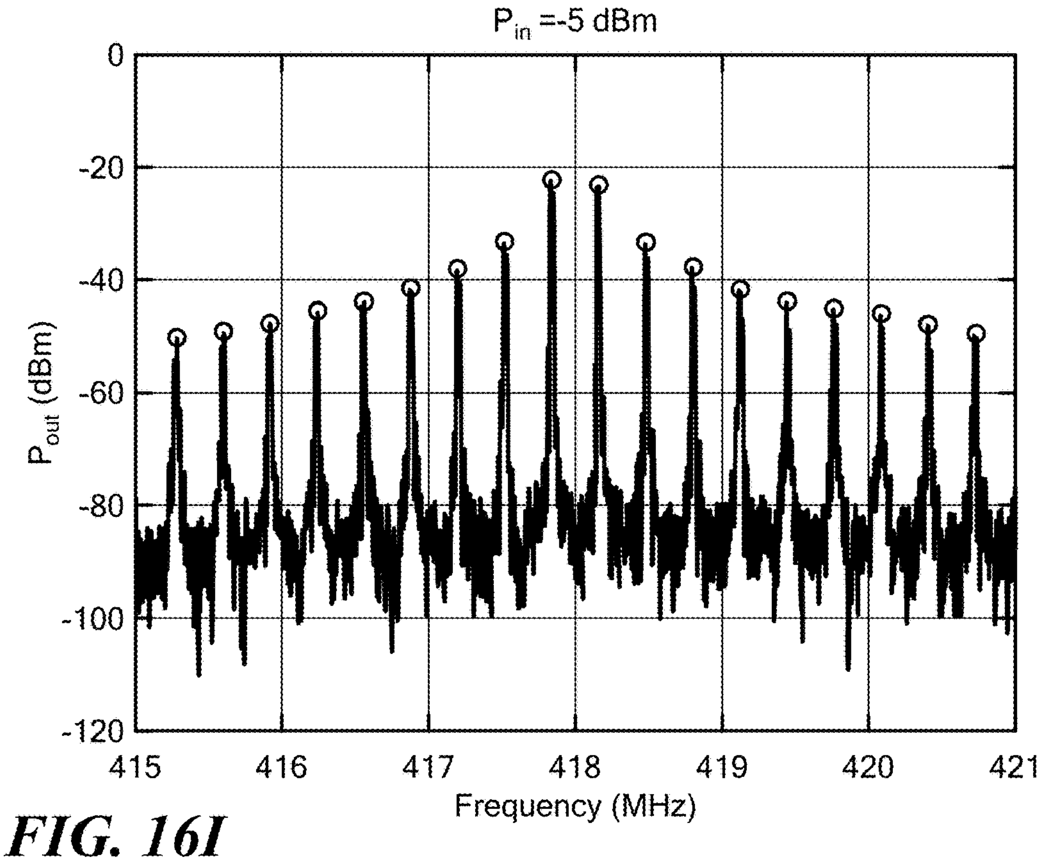
Figure 16J:
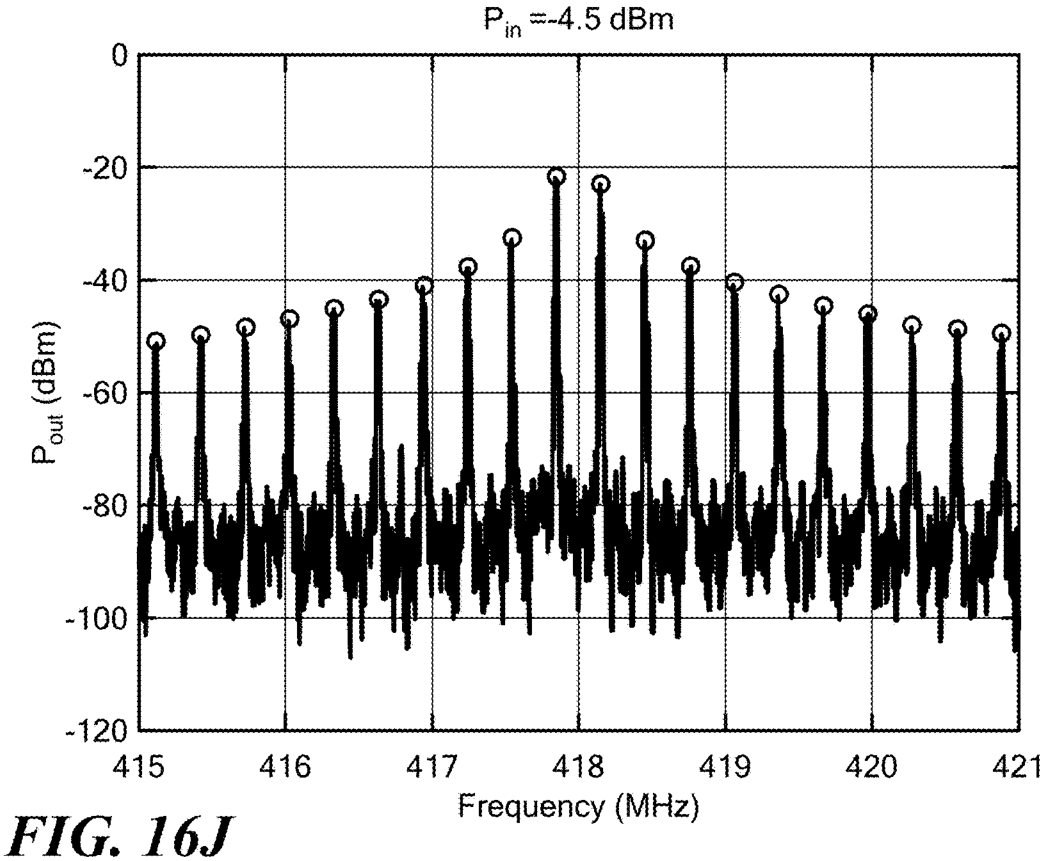
Figure 16K:
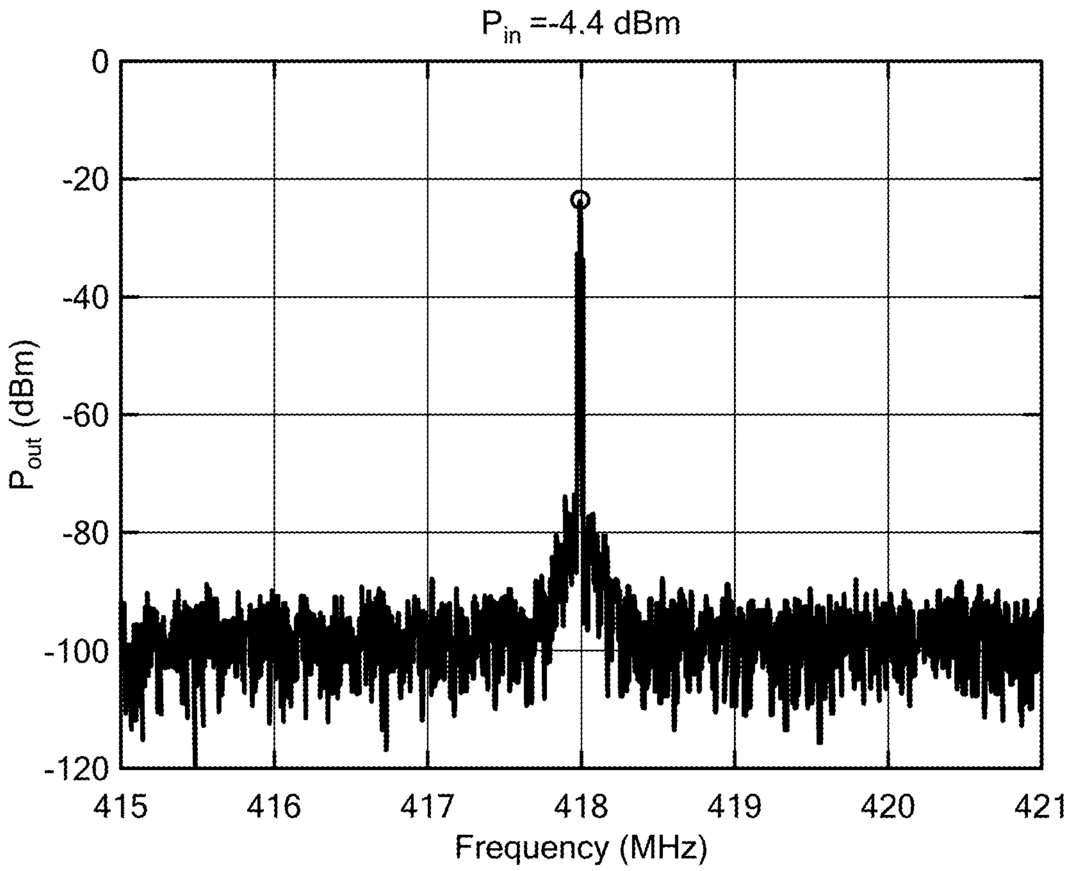

Characteristics of a prototype of the two-resonator qHT 200 are shown in FIGS. 14, 15, and 16A-16K. In particular, FIG. 14 illustrates a measured admittance response of the two Surface Acoustic Wave (SAW) resonators (A and B) used in the two-resonator qHT 200. FIG. 15 illustrates a measured frequency of the strongest output power tone produced by the two-resonator qHT 200 vs. the input power coming from an interrogating node. This frequency is equal to half of the input frequency ($f_{in}/2$) minus the modulation frequency. FIGS. 16A-16K illustrate measured output spectra of the two-resonator qHT 200 for different input power levels (Pin). The spectra clearly show that the generation of frequency combs is triggered, providing a means to remotely track the power received by the tag through a frequency read out scheme independent of multi-path, clutter, and a tag reader's self-interference.

Experimental Results

Referring now to FIG. 7, in order to demonstrate the unique operational features of qHTs, a qHT 100 prototype was developed as described above using off-the-shelf components assembled onto a printed circuit board and wherein the input notch filter has a resonant frequency $\omega_{input}\approx 418$ MHz which is approximately half of the resonant frequency of the LC notch filter placed in the output mesh $\omega_{input}\approx 836$ MHz.

The generation of frequency combs in the qHT 100 is enabled by the introduction of a high-Q microelectromechanical resonator, in this case a Surface Acoustic Wave (SAW) microelectromechanical resonator included in the output mesh 150.

Figure 8A:
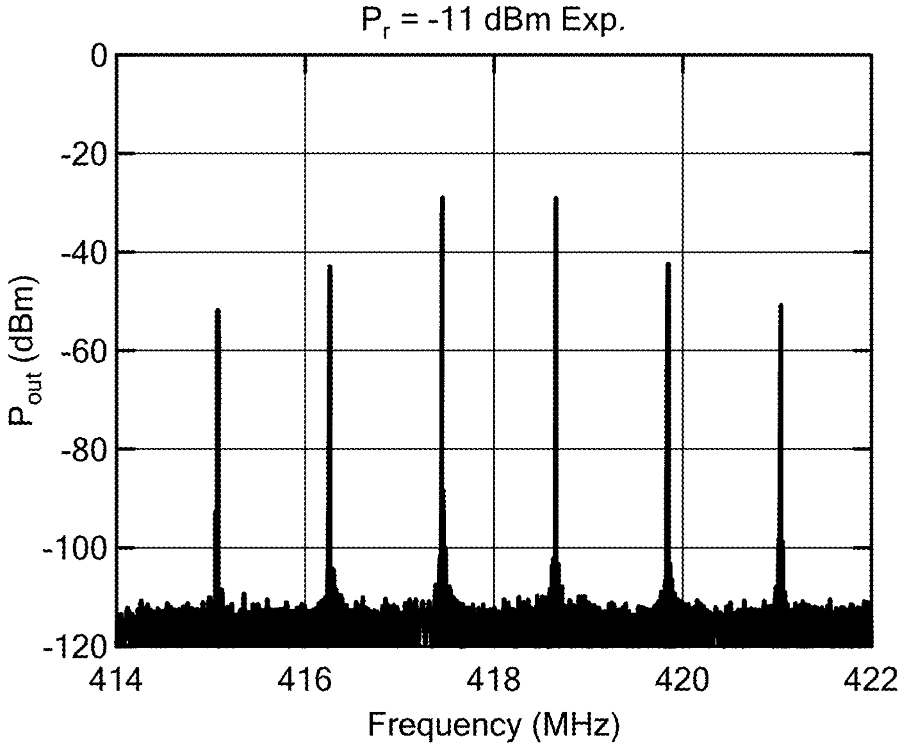
FIGS. 8A-8B illustrate measured output spectrum of the qHT of FIG. 7 for two different input power levels.
Figure 8B:
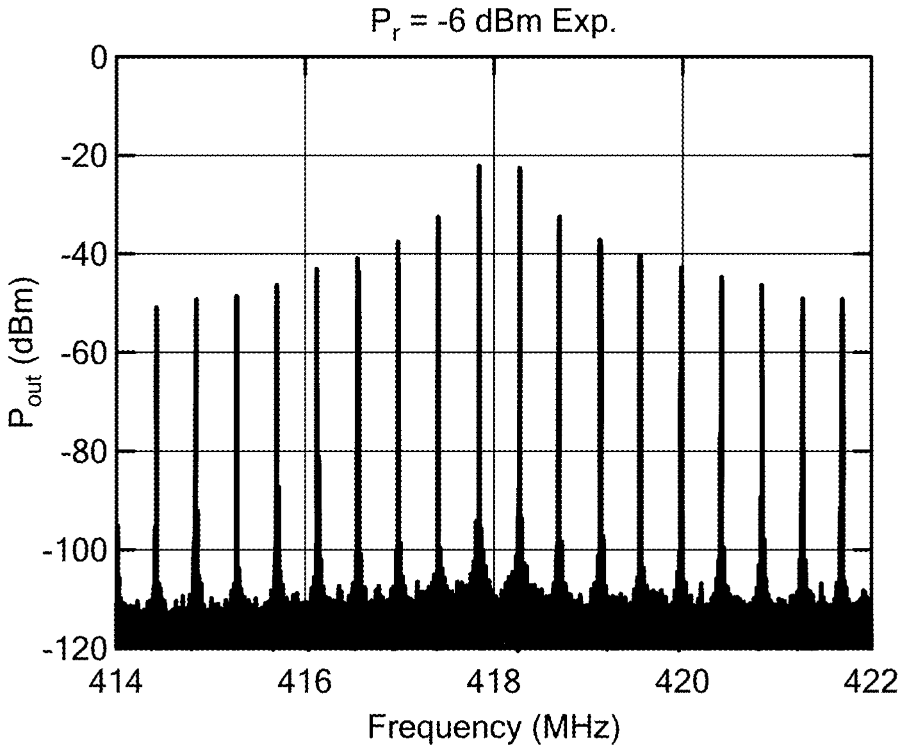
Figure 9:
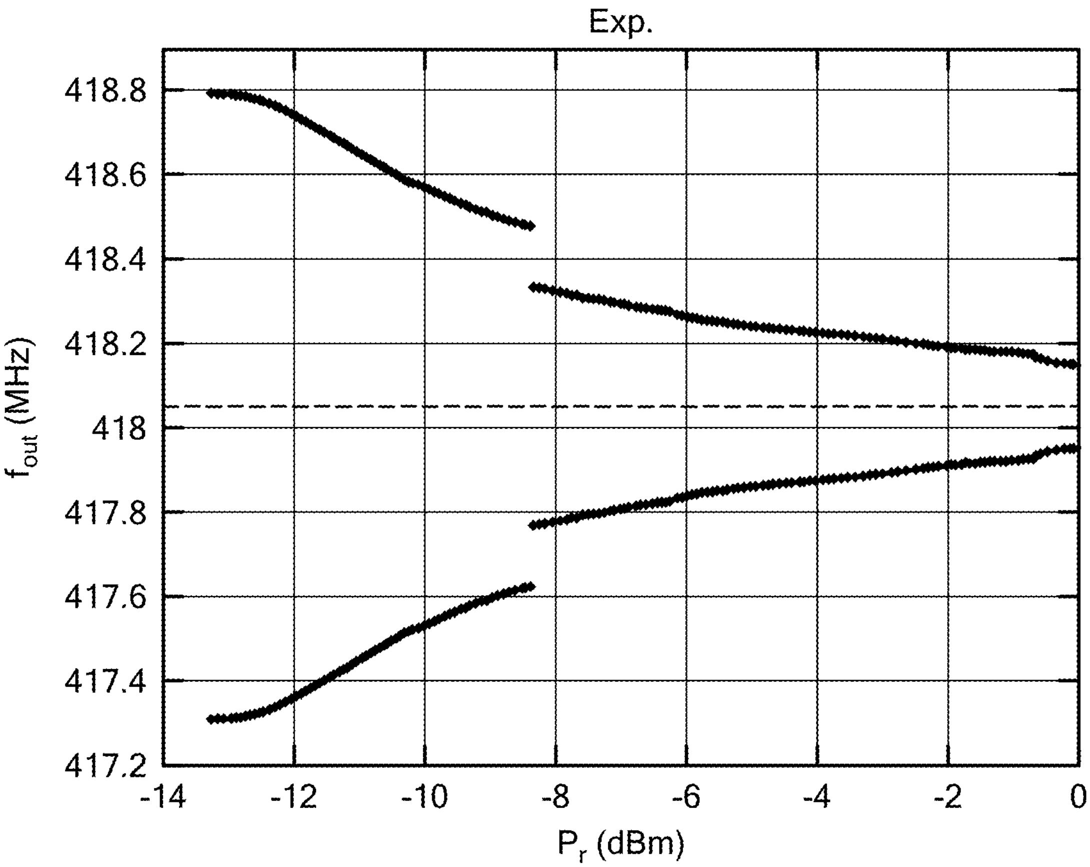
FIG. 9 illustrates measured frequency for two tones of a comb output signal produced by the qHT of FIG. 7. The illustrated two tones represent the first two tones surrounding a frequency equal to half of the adopted interrogation frequency (836 MHz) for different input power levels.

To characterize the electrical response of the qHT, first, a wired experiment was performed where the input and output ports of the device were directly connected to a signal generator having a transmitter and a spectrum analyzer respectively. The operating interrogation frequency for frequency comb generation was set to 836 MHz, which is approximately twice the resonant frequency of the resonator. Afterwards, $P_{th}$ (−13 dBm) was identified by gradually increasing $P_r$. This value is crucial as it directly relates to the read-range of the qHT, which represents the maximum operational distance of the device from its wireless transmitter. Then, the dependence of the measured Δf value on the qHT's $P_r$ value, which is the key feature allowing reliable, wireless extrapolation of the distance of the qHT from a wireless interrogating node, was studied. In this regard, the qHT's measured output spectrum was analyzed for different $P_r$ values as shown in FIGS. 8A and 8B, followed by the extraction of Δf for the same range of analyzed $P_r$ values as shown in FIG. 9. As shown, Δf varies proportionally with $P_r$, which in practice is a necessary condition to avoid ambiguities when correlating an extracted Δf value to only one specific $P_r$ value and, consequently, to only one d value. The presence of a subcritical bifurcation for $P_r\approx -8.5$ dBm was also detected. This bifurcation is attributed to higher order nonlinearities in the varactor's capacitance vs. voltage characteristic, which are significant when the varactor exhibits a voltage across its terminal approaching its built-in potential ($V_{bj}$) as it occurs in this case.

Figure 5:
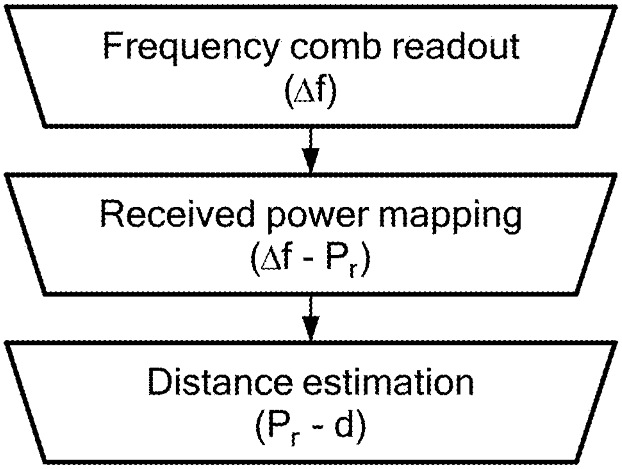
FIG. 5 is a flowchart illustrating steps for determining d from Δf in accordance with various embodiments.
Figure 10:
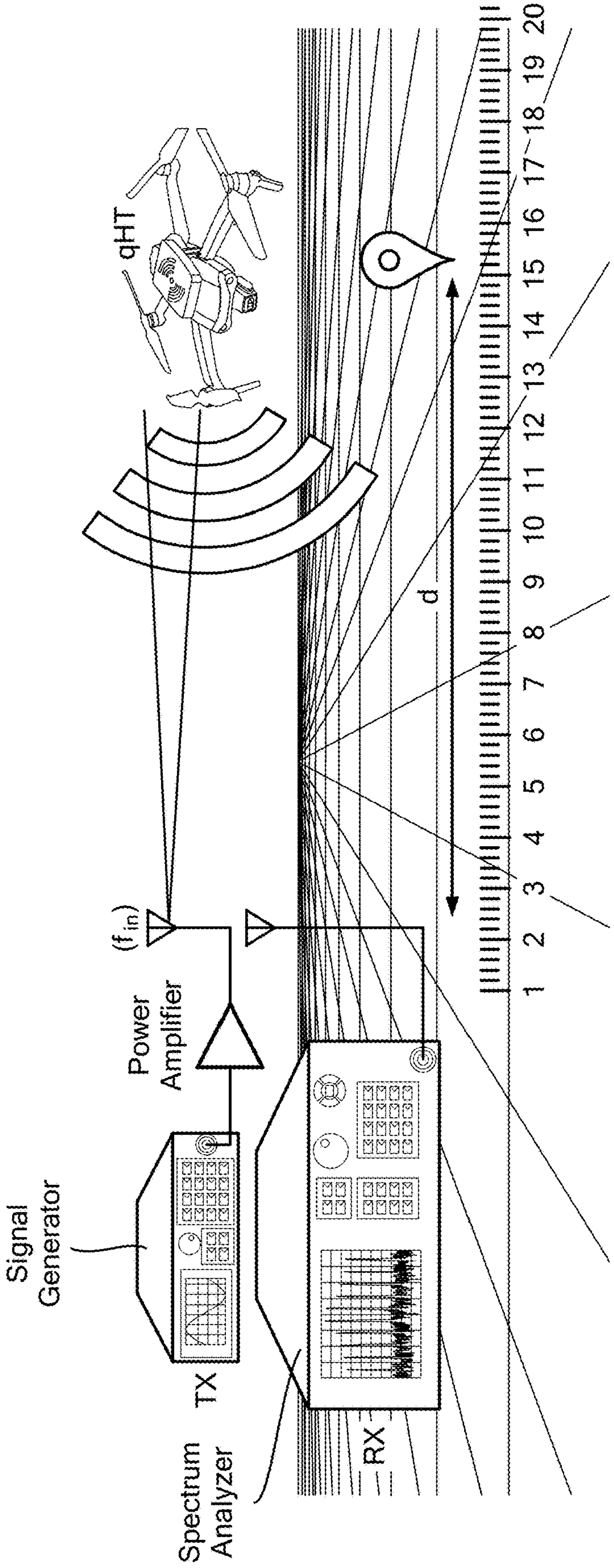
FIG. 10 illustrates a schematic view of an experimental setup used to assess an azimuthal distance of a drone having the qHT of FIG. 7 installed thereon at different distances from an interrogation node. The qHT of is mounted on the top of the drone and a signal generator having a transmitter and connected to a power amplifier is configured to remotely interrogate the qHT. The qHT responds with a frequency comb that is received by a spectrum analyzer.
Figure 11A:
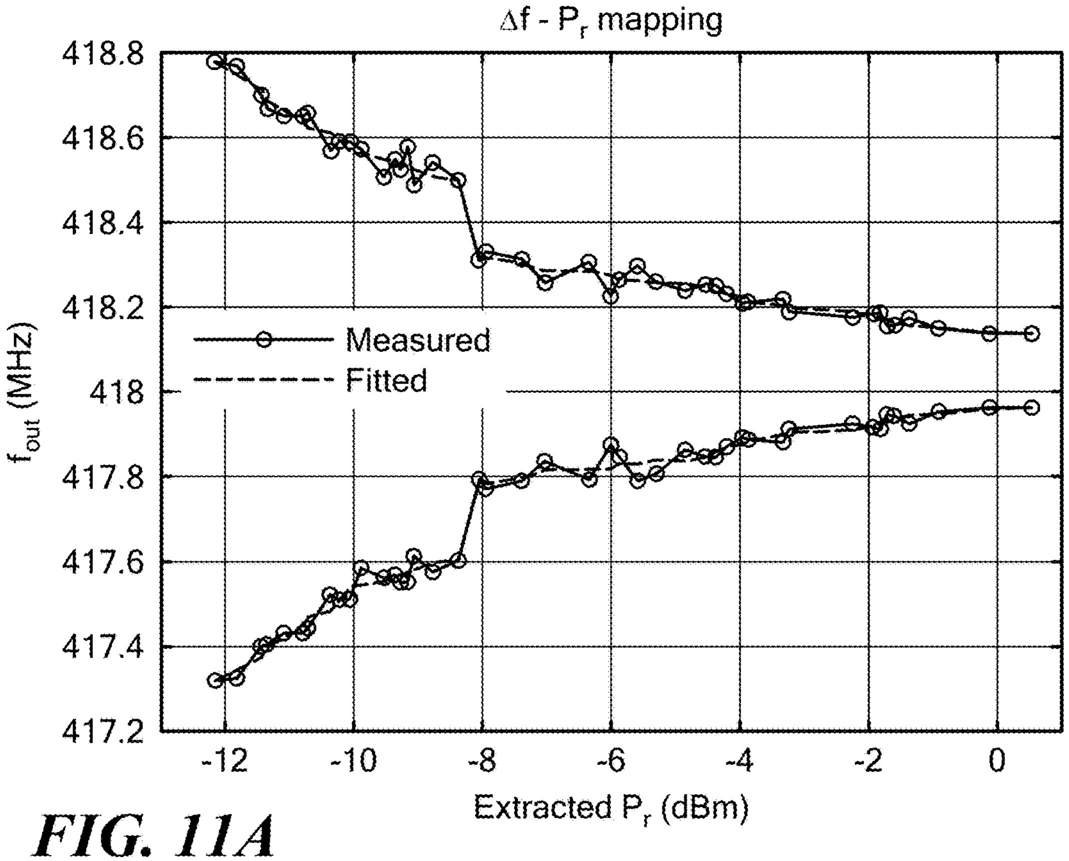
FIG. 11A illustrates measured frequencies for the strongest tones of a frequency comb generated by the qHT of FIG. 7 vs. the corresponding extracted $P_r$ values when the distance is spanned by the drone while flying.
Figure 11B:
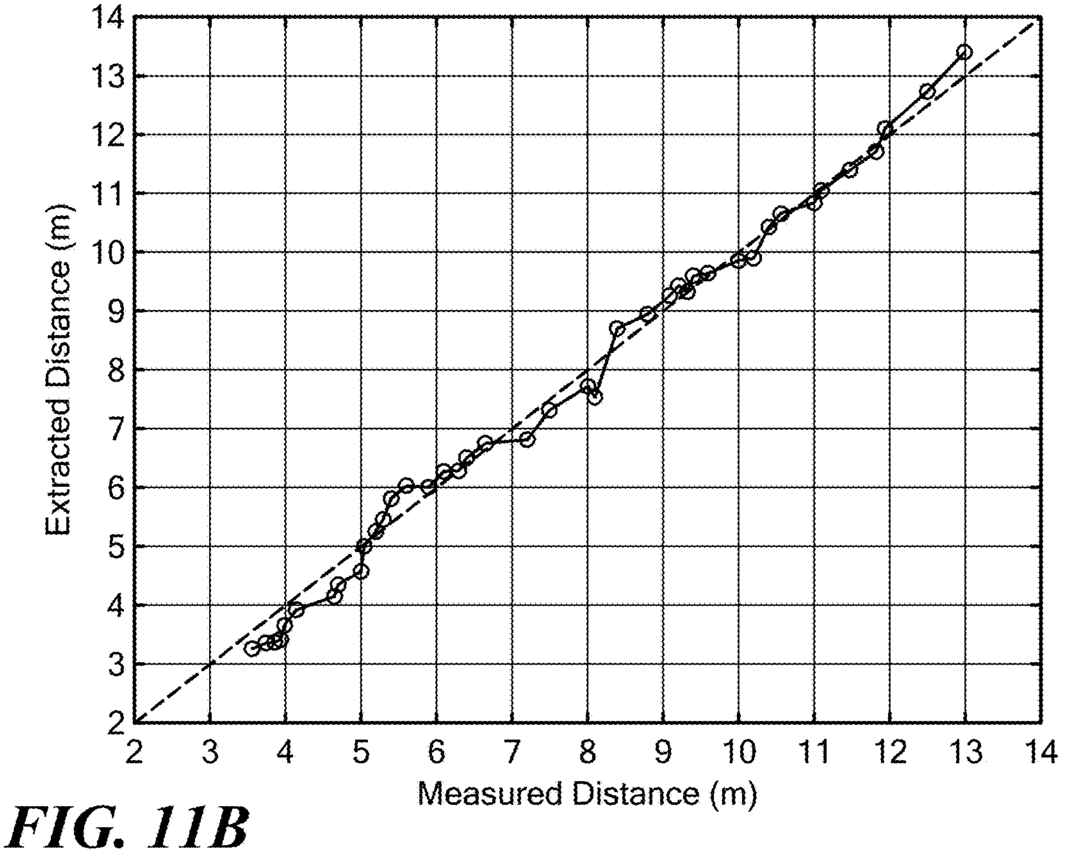
FIG. 11B illustrates distance of the drone from the interrogating node while flying as extracted by the qHT remote localization system vs. the distance measured with the ruler. The extracted distance is found by i) extracting Δf, ii) using the extracted Δf value to find $P_r$; and iii) using the found $P_r$ value and the Friis space propagation model to determine d. The reported values of d have been extracted from Δf for the case in which the drone is flying (c)
Figure 12A:
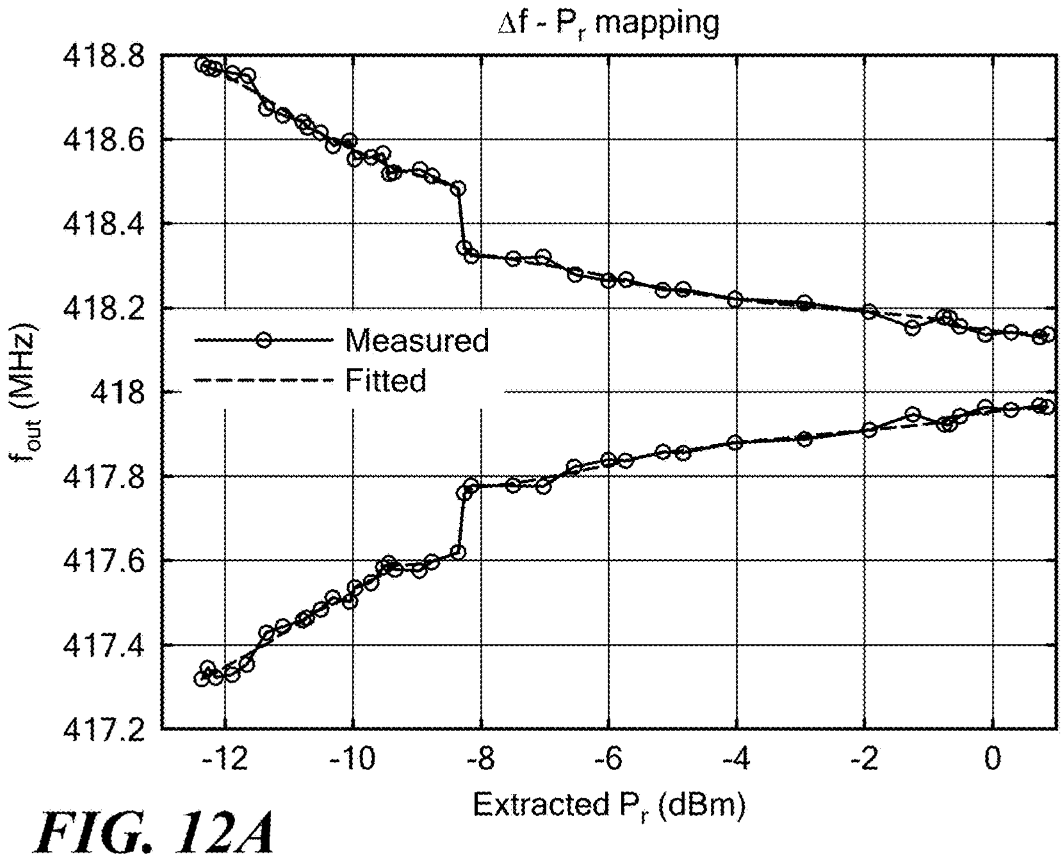
FIG. 12A illustrates measured frequencies for the strongest tones of a frequency comb generated by the qHT of FIG. 7 vs. the corresponding extracted $P_r$ values when the distance is spanned by the drone when manually moved.
Figure 12B:
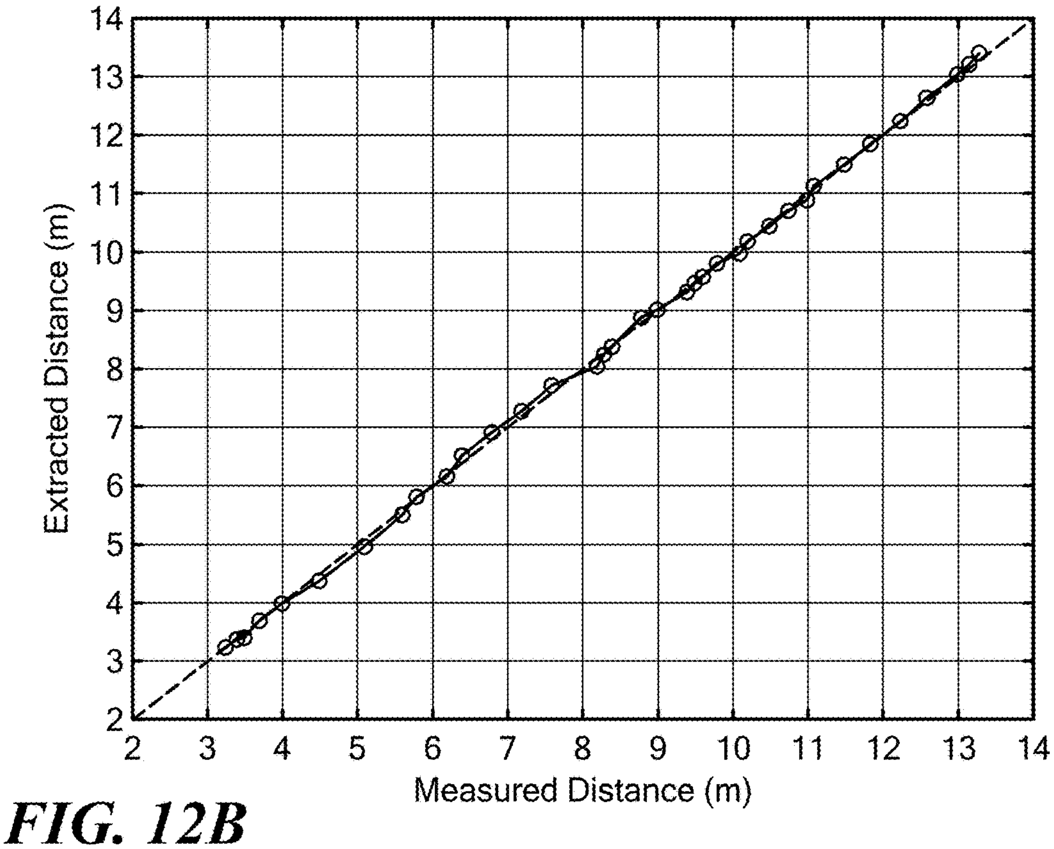
FIG. 12B illustrates distance of the drone from the interrogating node when the drone is manually moved as extracted by the qHT remote localization system vs. the distance measured with the ruler. The extracted distance is found by i) extracting Δf, ii) using the extracted Δf value to find $P_r$; and iii) using the found $P_r$ value and the Friis space propagation model to determine d. The reported values of d have been extracted from Δf for the case in which the drone is manually moved.

After building the Δf-$P_r$ mapping plot as demonstrated in FIG. 9, a second experiment was run to verify the proposed readout technique summarized In FIG. 5. The experiment was performed with the qHT placed on board a drone flying in a hall of the Interdisciplinary Science and Engineering Complex (ISEC) at Northeastern University. As shown in FIG. 10, a signal generator was connected to a directive Yagi antenna (A1) to generate and transmit a CW interrogation signal at $\omega_p$. Also, a spectrum analyzer connected to an off-the-shelf dipole antenna was used to wirelessly receive a portion of the backscattered signal generated by the qHT while remotely moving the drone along the direction of maximum gain of A1. During this experiment, the received Δf value for was received multiple points within the qHT's read range while simultaneously measuring the actual distance with a ruler. Then, $P_r$ was extracted from mapping the measured Δf as shown in FIG. 11A based on the Δf-$P_r$ mapping plot discussed in FIG. 9. Afterwards, by leveraging the Friis transmission equation, the distance of the drone for each investigated position was determined directly from the extracted Δf value. The d values extrapolated from Δf were compared with what was actually measured with the ruler and shown in 11B. In this respect, the error between the actual measured distances and the distances extracted through the collected Δf values does not exceed ±57 cm across a broad range of distances up to 13 meters. Interestingly, the maximum error measured at the farthest distance was found to be ±5 cm, which is less than the maximum error found across the entire measurements' range. It is worth noting that the accuracy of the measurements has been degraded by the inherently unstable nature of the drone while hovering. Therefore, to better assess the intrinsic accuracy of the qHT, an additional ranging experiment was performed wherein the drone was manually moved. In particular, the same setup used in the previous experiment was also used for the manual experiment and the distance of the drone was measured after moving it manually to several stationary positions away from A1. The Δf-$P_r$ mapping plot extracted from the previous experiment (shown in FIG. 11A) was rebuilt for this manual movement experiment and is shown in FIG. 12A. Because of the absence of the drone's hovering fluctuations, a better accuracy was obtained with a ranging error lower than ±16 cm across the same 13 meters operational range as shown in FIGS. 12A and 12B. Such measured accuracy is better than what achievable when relying on the current state-of-the-art passive tags for far-field ranging in uncontrolled electromagnetic settings, which enables best ranging accuracies of ≈50 cm and maximum read-out ranges not exceeding ~6.5 meters. Moreover, the qHT reported herein also shows the lowest relative error among the passive tags demonstrated for far-field ranging, which is equal to the ratio of the maximum error value to the maximum range value. This is achieved while requiring a single-tone interrogation signal. As a result, using qHTs permits to rely on readers that use narrowband low-power transceivers for the interrogation, and it allows to extract an accurate ranging information without running intense signal processing operations.

Summary

Described herein above are systems, methods, and experiments demonstrating how RF frequency combs produced by qHTs can be used to realize precise ranging of UVs in rich-multipath settings. Specifically, it was shown that the comb line spacing in a qHT is inversely proportional to the qHT's received input power level. Such a unique feature can be leveraged to wirelessly measure the distance from a qHT by reading out its generated comb line spacing. In fact, by encoding the distance information into their comb line spacing, and not into the amplitude or the phase of their backscattered signals like conventional passive tags currently do, qHTs can avoid ranging inaccuracies caused by multipath affecting their backscattered signal. In this regard, the experiments illustrate that it is possible to measure the distance of a qHT located up to 13 m away from a CW transmitter in an uncontrolled electromagnetic environment, and yet maintain an accuracy that does not exceed ±15 cm when just using a single-tone interrogation signal. In summary, qHTs are excellent candidates for localization of UVs in GPS-denied environments. Furthermore, the ability to generate frequency combs in a passive tag opens up exciting opportunities for other real-time sensing applications requiring an extreme sensitivity and accurate read-out capabilities without using battery-powered wireless sensing devices.

While example embodiments have been particularly shown and described, it will be understood by those skilled in the art that various changes in form and details may be made therein without departing from the scope of the embodiments encompassed or contemplated herein.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

What is claimed is:

1. A quasi-harmonic tag (qHT) comprising:

an electromagnetic resonator;

an input mesh including an input notch filter having a resonant frequency of $\omega_{input}$;

an output mesh including an output notch filter having a resonant frequency of $\omega_{output}$; and an antenna, wherein the qHT is configured to emit a comb output signal responsive to an input signal having an input frequency $\omega_p$ twice a resonance frequency of the electromagnetic resonator.

2. The qHT of claim 1, wherein the qHT is passive and batteryless.

3. The qHT of claim 1, wherein the comb output signal is symmetrically distributed around a frequency of $\omega_p/2$.

4. The qHT of claim 1, wherein a comb line spacing (Δf) of the comb output signal is a function of a power of the input signal.

5. The qHT of claim 4, wherein:

power received at the qHT ($P_T$) from the input signal is inversely proportional to a distance (d) of the qHT from a source of the input signal; and for a known transmission power (P), each Δf corresponds to a single d.

6. The qHT of claim 1, wherein the electromagnetic resonator includes at least one of a dielectric resonator, a surface acoustic wave (SAW) resonator, a bulk acoustic wave (BAW) resonator, a CMOS resonator, a ceramic resonator, or a distributed resonator.

7. The qHT of claim 1, further comprising at least one additional electromagnetic resonator.

8. The qHT of claim 1, wherein the antenna includes a single transceiver.

9. The qHT of claim 1, wherein:

the antenna is an input antenna of the input mesh; and the qHT further comprises an output antenna of the output mesh.

10. The qHT of claim 1, wherein at least one of the input notch filter or the output notch filter is a LC-notch filter.

11. The qHT of claim 1, further comprising a connecting circuit connecting the input mesh and the output mesh in a common branch of the input mesh and the output mesh to form a two-port degenerate parametric circuit.

12. The qHT of claim 9, wherein the connecting circuit includes one or more varactors and an inductor.

13. A remote localization system comprising:

at least one remote asset including a qHT of claim 5;

a localization device including:

a transmitter configured to transmit an input signal at a known power P;

a receiver configured to receive a comb output signal produced by the qHT of the at least one remote asset; and a processor configured to execute the steps of:

detecting a comb line spacing (Δf) of the comb output signal produced by the qHT of the at least one remote asset, and determining, from the detected Δf and P, a distance d between the at least one remote asset and the localization device.

14. The remote localization system of claim 13, wherein the localization device further comprises at least one of a directive wireless transceiver, a directive beam-steering transmitter, a narrowband low-power transceiver, or combinations thereof.

15. The remote localization system of claim 13, further comprising:

a second localization device configured to determine a second distance $d_2$ between the remote asset and the second localization device;

a third localization device configured to determine a third distance $d_3$ between the remote asset and the third localization device; and the processor further configured to execute the step of triangulating, from d, $d_2$, and $d_3$, a location of the remote asset.

16. A method for asset localization comprising:

receiving, at a remote asset including a qHT of claim 5, an input signal having a received power $P_T$ at the qHT;

emitting, responsive to the input signal, a comb output signal having a comb line spacing (Δf), wherein Δf is a function of $P_T$ and, for any transmission power (P) of the input signal, $P_T$ is inversely proportional to a distance (d) of the qHT from a source of the input signal; and determining, from the Δf of the comb output signal and P, the distance d between the remote asset and the source of the input signal.

17. The method of claim 16, wherein the source of the input signal is a localization device and the method further comprises:

transmitting, from a transmitter of the localization device, the input signal at the transmission power P.

18. The method of claim 17, further comprising receiving, at the localization device, the comb output signal produced by the qHT of the remote asset.

19. The method of claim 18, further comprising detecting, at the localization device, the comb line spacing (Δf) of the comb output signal produced by the qHT of the remote asset.

20. The method of claim 19, wherein the step of determining further comprises calculating, by a processor of the localization device using the detected Δf and P, the distance d between the remote asset and the localization device.

* * * * *